(12) United States Patent
Hirunuma et al.

(10) Patent No.: US 7,113,331 B2
(45) Date of Patent: Sep. 26, 2006

(54) BINOCULAR TELESCOPE WITH PHOTOGRAPHING FUNCTION

(75) Inventors: Ken Hirunuma, Tokyo (JP); Shuji Yoneyama, Saitama (JP)

(73) Assignee: PENTAX Corporation, Tokyo (JP)

( * ) Notice: Subject to any disclaimer, the term of this patent is extended or adjusted under 35 U.S.C. 154(b) by 55 days.

(21) Appl. No.: 10/644,799

(22) Filed: Aug. 21, 2003

(65) Prior Publication Data

US 2004/0036966 A1 Feb. 26, 2004

(30) Foreign Application Priority Data

Aug. 22, 2002 (JP) .......................... P2002-241863

(51) Int. Cl.
*G02B 23/00* (2006.01)
(52) U.S. Cl. .................. 359/427; 359/419; 359/428; 359/472
(58) Field of Classification Search ................ 359/407, 359/412, 418, 419, 427, 428, 464, 472, 482; 348/348, 341; 396/149, 432
See application file for complete search history.

(56) References Cited

U.S. PATENT DOCUMENTS

| | | | |
|---|---|---|---|
| 3,622,242 A | * | 11/1971 | Land et al. ............... 356/12 |
| 4,067,027 A | * | 1/1978 | Yamazaki ................. 396/432 |
| 5,504,547 A | | 4/1996 | Mizukawa |
| 6,088,053 A | | 7/2000 | Hammack et al. |
| 2001/0028498 A1 | | 10/2001 | Haga et al. |
| 2003/0086165 A1 | * | 5/2003 | Cross et al. ............... 359/424 |

FOREIGN PATENT DOCUMENTS

| | | |
|---|---|---|
| GB | 0724624 | 2/1955 |
| GB | 1234330 | 6/1971 |
| JP | 36-12387 | 8/1961 |
| JP | 6-2330 | 1/1994 |
| JP | H07-0114062 | 5/1995 |
| JP | 2001-281555 | 10/2001 |
| WO | 01/52531 | 7/2001 |

OTHER PUBLICATIONS

English language Abstract JP No. H07-0114062.

* cited by examiner

*Primary Examiner*—Drew A. Dunn
*Assistant Examiner*—Joshua L. Pritchett
(74) *Attorney, Agent, or Firm*—Greenblum & Bernstein, P.L.C.

(57) ABSTRACT

A binocular telescope with a photographing function comprises a pair of telescopic optical systems, a photographing optical system, and a pair of reticle elements, on which reticles are formed. The reticle elements are provided in the telescopic optical systems for focusing the telescopic optical systems. The distance between the optical axes of the telescopic optical systems can be adjusted, so that the reticle images are fused. The shapes of the fused reticle images are geometrically non-coordinate with each other.

15 Claims, 18 Drawing Sheets

FIG.13A
LEFT RETICLE 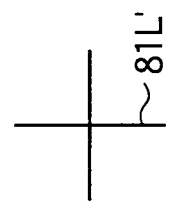 + RIGHT RETICLE 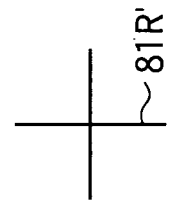 = FUSED RETICLE 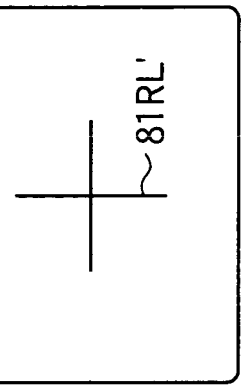
FIG.13B
LEFT RETICLE 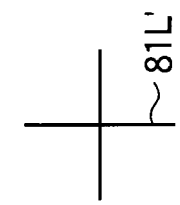 + RIGHT RETICLE 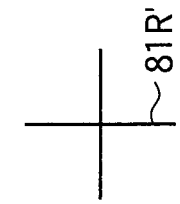 = FUSED RETICLE 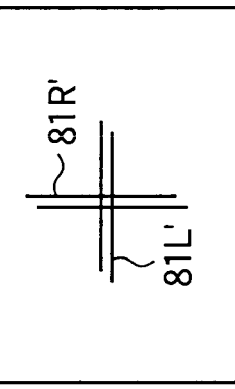

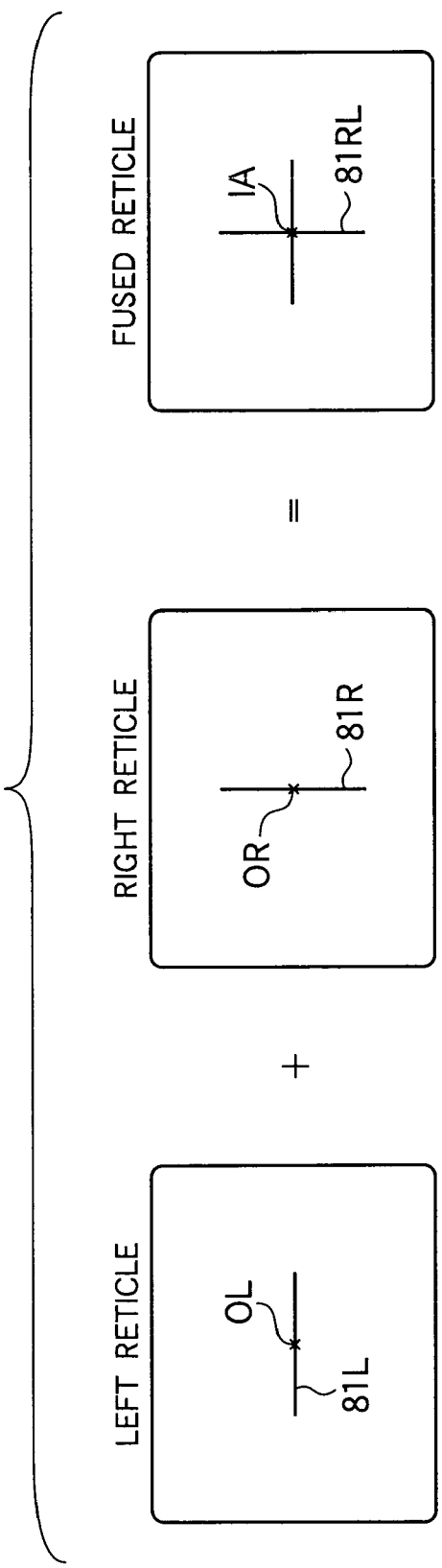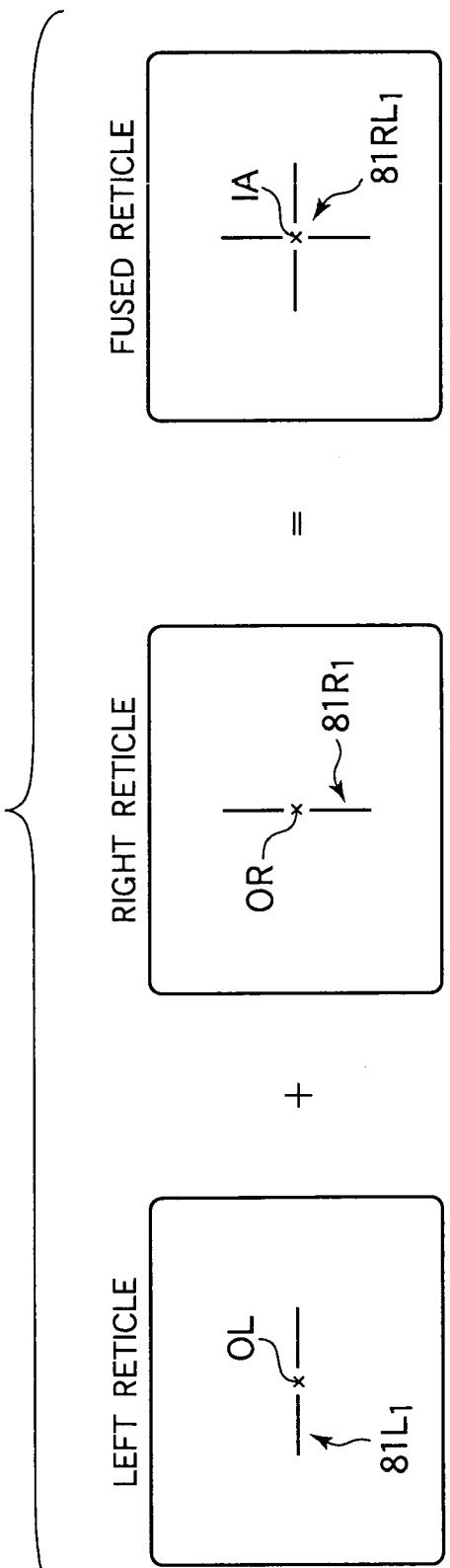

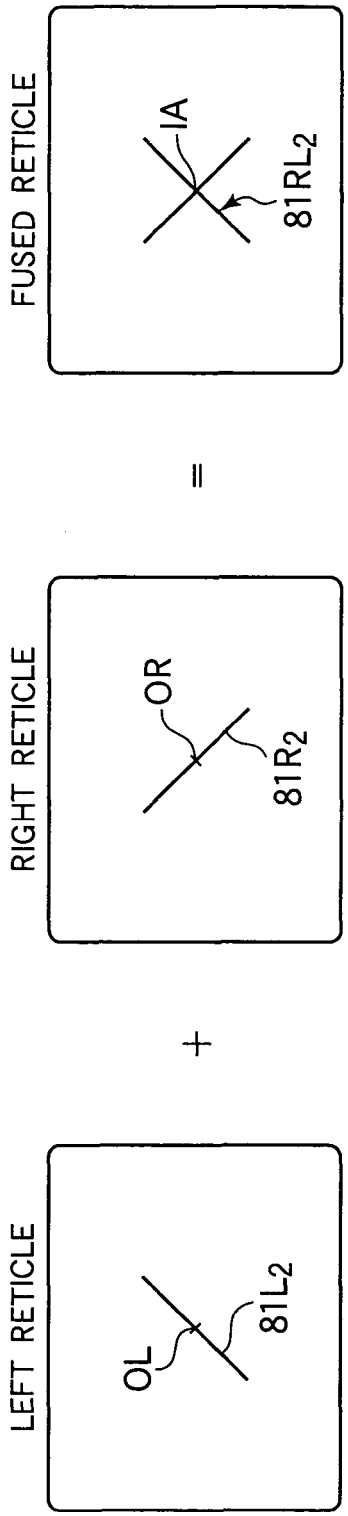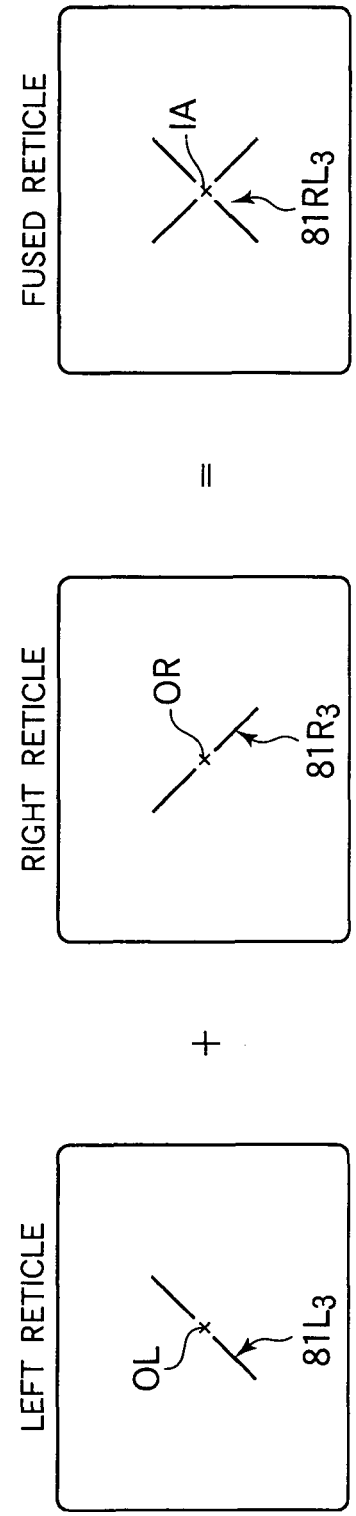

FIG.16A
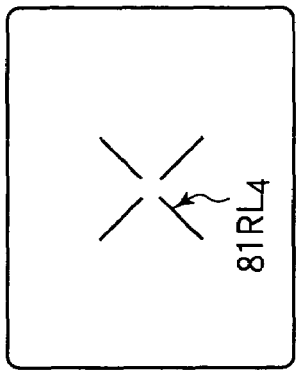
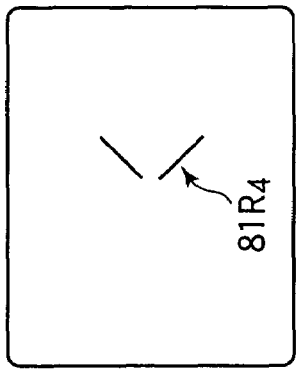
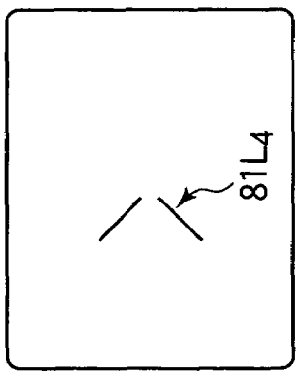
FIG.16B
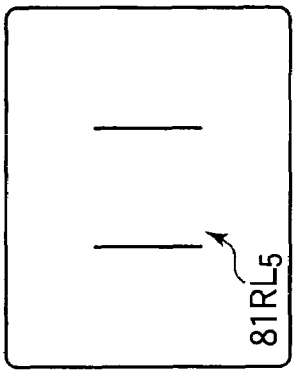
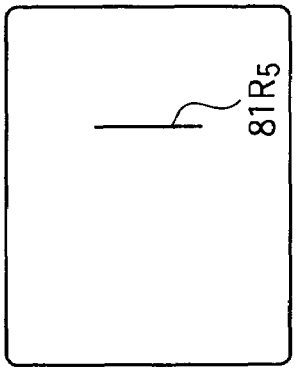
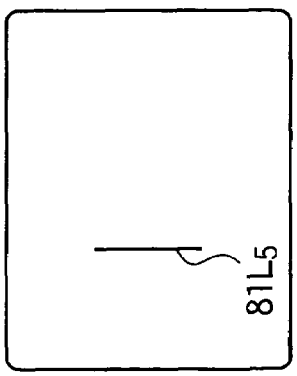

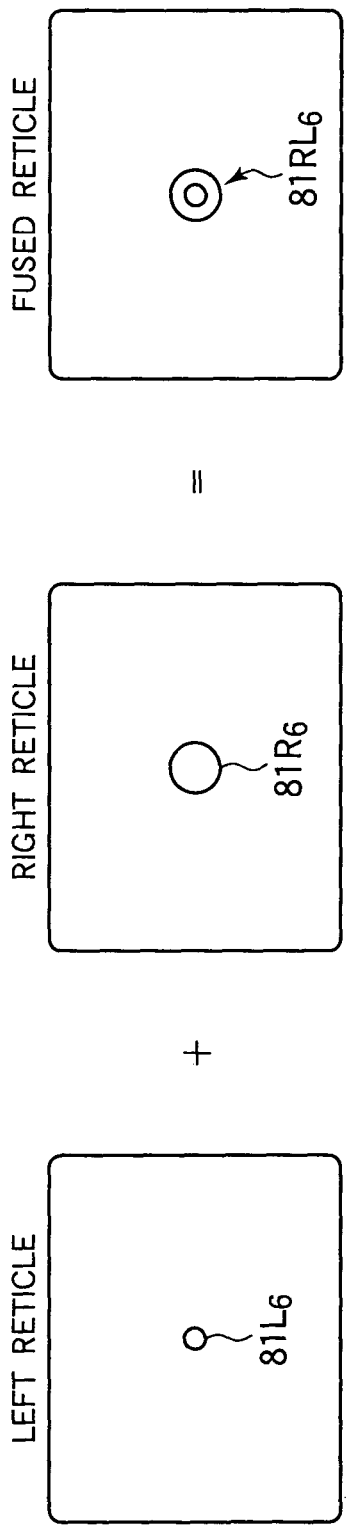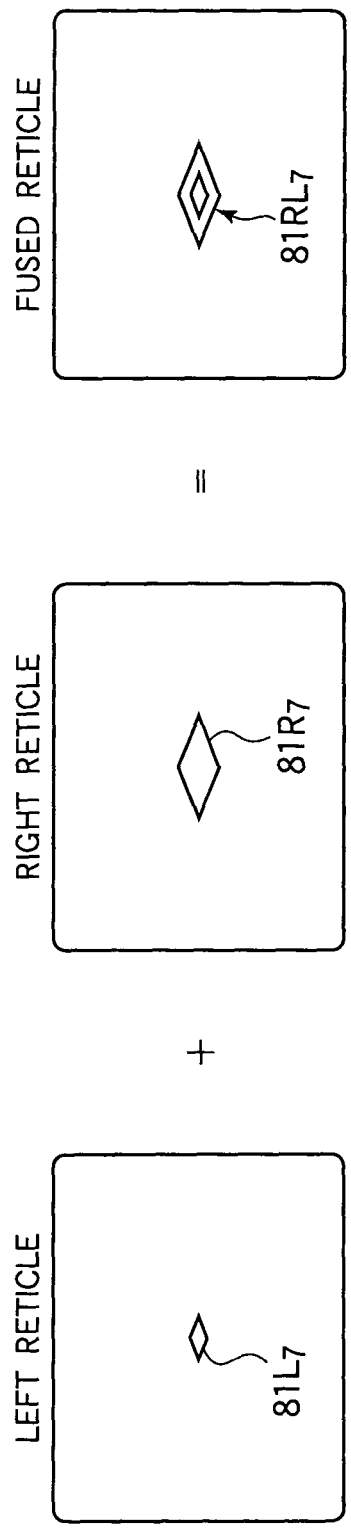

BINOCULAR TELESCOPE WITH PHOTOGRAPHING FUNCTION

BACKGROUND OF THE INVENTION

1. Field of the Invention

The present invention relates to a binocular telescope with a photographing function, which has a pair of observation optical systems and a photographing optical system, and is constructed in such a manner that a focusing mechanism for the pair of observation optical systems and a focusing mechanism for the photographing optical system are operated in association with each other so that the pair of observation optical systems is utilized as a focusing device for the photographing optical system.

2. Description of the Related Art

As is well known, binocular telescopes are used for watching sports, wild birds, and so on. When using a binocular telescope, it is often the case that the user sees something that he or she would like to photograph. Typically, he or she will fail to photograph the desired scene because he or she must change a camera for the binocular telescope and during this time the chance is lost. For this reason, a binocular telescope containing a camera is proposed, whereby a photograph can be taken immediately by using the camera contained in the binocular telescope while continuing the observation through the binocular telescope.

For example, Japanese Unexamined Utility Model Publication (JUUMP) (KOKAI) No. 6-2330 discloses a binocular telescope with a photographing function, i.e., a combination of a binocular telescope and a camera, in which the camera is simply mounted in the binocular telescope. The binocular telescope is provided with a pair of telescopic optical systems for observing an observed object in an enlarged state, and a photographing optical system for photographing the observed image. Namely, in the binocular telescope with a photographing function, the pair of telescopic optical systems functions not only as a viewfinder optical system for the photographing optical system, but also as a telescopic binocular system.

Generally, in an observation optical system such as a binocular telescope, when the rear focal point of the objective lens system and the front focal point of the ocular lens system roughly coincide with each other, an observed object at infinity (i.e., distant view) can be observed in an in-focus state through the observation optical system. Accordingly, for observing an observed object at a shorter distance than infinity (i.e., close-range view) in an in-focus state, a focusing operation is needed for focusing on the close-range view. In such a focusing operation, the objective lens system and the ocular lens system are separated from the in-focus state of the distant view. Therefore, in the observation optical system, a focusing mechanism is mounted, which moves the objective lens system and the ocular lens system to adjust the distance therebetween. Concretely, the focusing mechanism comprises a rotary wheel, disposed adjacent to the observation optical system, and a movement conversion mechanism for converting a rotational movement of the rotary wheel into a relative back-and-forth movement of the objective lens system and the ocular lens system.

In the binocular telescope with a photographing function disclosed in the above-described JUUMP '330, however, there is no description of the focusing operation of the pair of observation optical systems. Further, as described above, the pair of observation optical systems functions as a viewfinder optical system for indicating an observed range, and '330 does not indicate how the photographing optical system focuses on an object to be photographed.

U.S. Pat. No. 4,067,027 discloses another type of binocular telescope with a photographing function, which is provided with a pair of observation optical systems and a photographing optical system. In this binocular telescope with a photographing function, a focusing mechanism for the pair of observation optical systems is provided with a mechanism for performing a focusing operation of the photographing optical system. Namely, by rotating the rotary wheel of the focusing mechanism manually, the objective lens system and the ocular lens system are moved relative to each other in each of the observation optical systems, which causes the photographing optical system to move relative to a surface of a silver halide film, and thus, the focusing operations are performed for the pair of observation optical systems and the photographing optical system. Thus, when an observed object is observed in an in-focus state through the pair of observation optical systems, the object is also in an in-focus state in the photographing optical system. Therefore, if a photographing operation is carried out when the observed object is observed in an in-focus state through the pair of observation optical systems, the object image is focused on a surface of the silver halide film.

When different users observe an observed object in an in-focus state through an observation optical device such as a binocular telescope, the observation optical system is not necessarily observed with the same dioptric power for each user. This is because, generally, human eyes have the ability to adjust, so that an object in a range from 15 cm to infinity ahead of the eyes can be focused. This ability to adjust depends upon the age of the observer, so that the range in which the eyes can focus on an object is different depending upon the observer. Thus, even if the dioptric power of the observation optical system is offset from a usual value, a human can still observe the observed object image through the observation optical system as a focused image. Therefore, in the binocular telescope with the photographing function described in U.S. Pat. No. '027, even if the observed object image is observed through the pair of observation optical systems in an in-focus state after manual operation of the rotary wheel, the observed object image is not necessarily focused by the photographing optical system. Thus, it may happen that, although the observed object image is observed through the pair of observation optical systems in an in-focus state, the photographed image is not in an in-focus state.

To solve the problem described above, it is proposed in Japanese Examined Patent Publication (KOKOKU) No. 36-12387 that a reticle element (or focusing index element) be movably provided at an in-focus position of the ocular optical system of the observation optical system so that the observation optical system is always focused with a constant dioptric power. The reticle element is a transparent glass plate, for example, on which an index having a proper shape (e.g., a cross) is formed. If the index element is positioned at an in-focus position of the ocular optical system of the observation optical system, the user observes the observed object in an in-focus state at the position of the index. Namely, the observed object is always observed with a constant dioptric power. Therefore, when the observation optical system reaches an in-focus state, the photographing optical system is adjusted in an in-focus state in association with the observation optical system. Thus, in the binocular telescope with a photographing function, the observation optical system can be utilized as a focusing device for the photographing optical system.

Generally, the reticle element is not assembled in each optical system of a pair of observation optical systems, but provided only in one of the observation optical systems. This is because, when the interpupillary distance of the pair of observation optical systems is adjusted so as to fuse the right and left observed images, it is difficult to completely superpose the right and left reticle images on each other. Namely, although a binocular telescope is designed in such a manner that, when the interpupillary distance of the pair of observation optical systems is perfectly adjusted, the optical axes of the pair of observation optical systems are completely coincident with each other, it is very difficult to make the optical axes completely coincident. Therefore, when the reticle element is assembled in each of the observation optical systems, the pair of reticles are observed slightly offset from each other, when fusing the right and left observed images, and the offset reticle images are distracting to the user. Accordingly, the reticle element is assembled in one of the observation optical systems In practice, the reticle element is often provided in the right observation optical system, since, in most people (around 80%), the right eye is more skillful than the left eye.

In the binocular telescope with a photographing function, in which a reticle element is provided, it is necessary to perform a dioptric power adjustment depending upon the eyesight of the user. Therefore, the ocular optical systems of a pair of observation optical systems are constructed in such a manner that their positions relative to the in-focus positions of the objective optical systems can be adjusted. Namely, first, the user adjusts the positions of the ocular lens systems so as to be able to observe the reticle image in an in-focus state. In this state, when performing a focusing operation of the pair of observation optical systems to focus on the observed image, the observed image is formed in an in-focus state in the photographing optical system as a photographed image, and thus, a focused photographed image can be obtained.

In a binocular telescope in which a reticle element is assembled in the right observation optical system, although the position of the ocular lens system can be adjusted relative to the in-focus position of the objective optical system to adjust the dioptric power in the left observation optical system, a reticle element is not assembled in the left observation optical system, and therefore, it is difficult to perform a dioptric power adjustment properly in the left observation optical system. Thus, in the left observation optical system, the observed image may be observed in a state which is offset from a proper dioptric power with which the left eye, in a relaxed state, of the user observes the observed image. If an observation using the binocular telescope is carried out for a long time in the offset state, the eyes will become tired since the adjusting performance of the eyes is continually carried out.

On the other hand, for a user whose left eye is more skillful than the right eye, since the focusing operation for the observed image is forcedly performed using the right observation optical system, the eyes will become more strained. Further, when a user whose left eye is more skillful than the right eye is not consciously focusing an observed image using the right observation optical system, the focusing operation for the observed image tends to be performed using the left observation optical system. In this focusing operation, since there is no reticle element in the left observation optical system, the adjusting operation of the left eye occurs, so that the dioptric powers of the right and left observation optical systems are offset. Thus, in the photographing optical system, the observed image cannot be formed in an in-focus state.

SUMMARY OF THE INVENTION

Therefore, an object of the present invention is to provide a binocular telescope with a photographing function, in which the dioptric powers of the ocular optical systems can be properly adjusted with respect to the reticle formed in a pair of observation optical systems, and where the reticle does not become a distraction when fusing the reticle images.

According to the present invention, a binocular telescope with a photographing function, comprises a first focusing mechanism, a second focusing mechanism, an association mechanism, a pair of reticle elements, and an interpupillary distance adjusting mechanism.

The first focusing mechanism focuses the pair of observation optical systems so as to observe an object through the pair of observation optical systems. The second focusing mechanism focuses the photographing optical system so as to photograph the object through the photographing optical system. The association mechanism associates the first and second focusing mechanisms with each other in such a manner that the pair of observation optical systems and the photographing optical system are always kept in a focused state. Reticles are formed on the pair of reticle elements, which are provided in the pair of observation optical systems for focusing the pair of observation optical systems with a predetermined dioptric power during operations of the first and second focusing mechanisms. Each of the pair of reticle elements is arranged at an in-focus position of an objective lens system of the observation optical system. A position of an ocular lens system of the observation optical system is adjustable relative to the position of the reticle element so as to adjust the dioptric power. The interpupillary distance adjusting mechanism adjusts the distance between the optical axes of the pair of observation optical systems. When the optical axes of the pair of observation optical systems are made completely coincident with the interpupillary distance of the user by using the interpupillary distance adjusting mechanism so that the reticle images of the pair of reticle elements are fused, the shapes of the fused reticle images are geometrically non-coordinate with each other.

The fused reticle images may show point symmetry with respect to an imaginary optical axis, defined by superposing the optical axes of the pair of observation optical systems, when the reticle images are fused. The fused reticle images may show line symmetry with respect to a straight line intersecting an imaginary optical axis, defined by superposing the optical axes of the pair of observation optical systems, when the reticle images are fused.

Each of the reticles may comprise at least one line segment, in which case, each of the reticles may comprise at least two line segments, which extend radially from the optical axis of the corresponding observation optical system, or which extend radially from a circular area encircling the optical axis of the corresponding observation optical system.

Each of the reticles may comprise at least one geometrical figure, in which case, each of the reticles comprises a geometrical figure the center of which is coincident with the optical axis of the corresponding observation optical system, the geometrical figures being similar figures.

Each of the reticles may comprise at least one dot, in which case, each of the reticles may comprise a plurality of dots which are arranged on a plane vertical to the optical axis of the corresponding observation optical system, the plurality of dots being aligned on line segments which are symmetrical with respect to a straight line on the plane. In another example, one of the reticles may comprise a dot which is aligned on the optical axis of the corresponding observation optical system, and the other of the reticles may comprise a plurality of dots which are arranged on a plane vertical to the optical axis of the corresponding observation optical system, and arranged around the optical axis.

Preferably, the association mechanism comprises a rotary wheel member having a manually operated rotary wheel; each of the pair of observation optical systems comprises two optical system elements that are movable along the optical axis of the observation optical system to focus the observation optical system; the first focusing mechanism forms a first movement-conversion mechanism for converting a rotational movement of the rotary wheel member into a relative back-and-forth movement of the two optical system elements; the photographing optical system is movable relative to an imaging plane along the optical axis of the photographing optical system to focus the photographing optical system; and the second focusing mechanism forms a second movement-conversion mechanism for converting a rotational movement of the rotary wheel member into a back-and-forth movement of the photographing optical system elements relative to the imaging plane.

In this case, the rotary wheel member may comprise a rotary wheel cylinder in which a lens barrel is housed so as to be movable along the central axis of the rotary wheel cylinder. The photographing optical system is housed in the lens barrel. The second movement-conversion mechanism may comprise a first cam groove formed in one of the rotary wheel cylinder and the lens barrel, and a first cam follower formed in the other of the rotary wheel cylinder and the lens barrel. The first cam groove may be formed in such a manner that a rotational movement of the rotary wheel cylinder is converted into a back-and-forth movement of the lens barrel along the central axis of the rotary wheel cylinder.

Preferably, the first movement-conversion mechanism comprises a second cam groove formed on an outer surface of the rotary wheel cylinder, an annular member that has a second cam follower engaged with the first cam groove and that is attached on an outer surface of the rotary wheel cylinder to move along the central axis of the rotary wheel cylinder, and a movement transmission mechanism that transmits the movement of the annular member to one of the two optical system elements of each of the pair of observation optical systems.

The pair of observation optical systems may be mounted on an optical system mount plate that comprises first and second plates that are movable relative to each other, one of the pair of observation optical systems may be placed on the first plate, and the other of the pair of observation optical systems is placed on the second plate, so that the distance between the optical axes of the pair of observation optical systems is adjusted by changing the relative positions of the first and second plates.

In this case, the first and second plates maybe linearly moved relative to each other, so that the optical axes of the pair of observation optical systems are moved in a predetermined plane, whereby the distance between the optical axes of the pair of observation optical systems is changed.

BRIEF DESCRIPTION OF THE DRAWINGS

The objects and advantages of the present invention will be better understood from the following description, with reference to the accompanying drawings in which:

FIG. 13A is a view showing that the optical axes of the pair of telescopic optical systems are made completely coincide by adjusting the interpupillary distance of the optical axes so that the reticles are completely fused;

FIG. 13B is a view showing that the optical axes of the pair of telescopic optical systems are made not completely coincide by adjusting the interpupillary distance of the optical axes so that the reticles are fused with offset;

FIG. 14A is a view schematically showing a fused image of a first example of the right and left reticles;

FIG. 14B is a view schematically showing a fused image of a second example of the right and left reticles;

FIG. 15A is a view schematically showing a fused image of a third example of the right and left reticles;

FIG. 15B is a view schematically showing a fused image of a fourth example of the right and left reticles;

FIG. 16A is a view schematically showing a fused image of a fifth example of the right and left reticles;

FIG. 16B is a view schematically showing a fused image of a sixth example of the right and left reticles;

FIG. 17A is a view schematically showing a fused image of a seventh example of the right and left reticles;

FIG. 17B is a view schematically showing a fused image of an eighth example of the right and left reticles;

DESCRIPTION OF THE PREFERRED EMBODIMENTS

Figure 1:
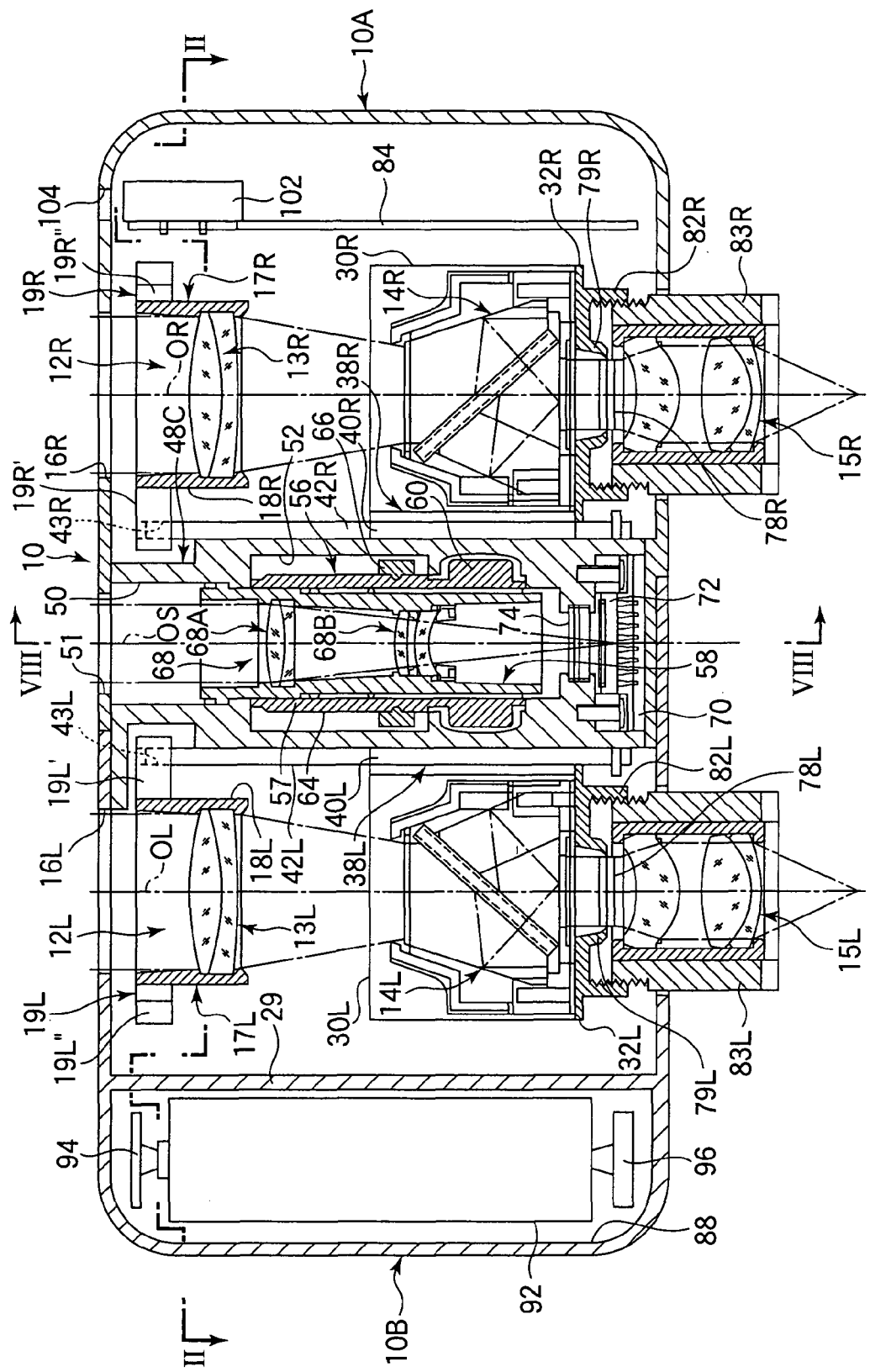
FIG. 1 is a horizontal sectional view showing a binocular telescope with a photographing function, which is an embodiment of an observation optical device according to the present invention, in a state in which a movable casing section is set at a retracted position.

The present invention will be described below with reference to the embodiments shown in the drawings.

Figure 2:
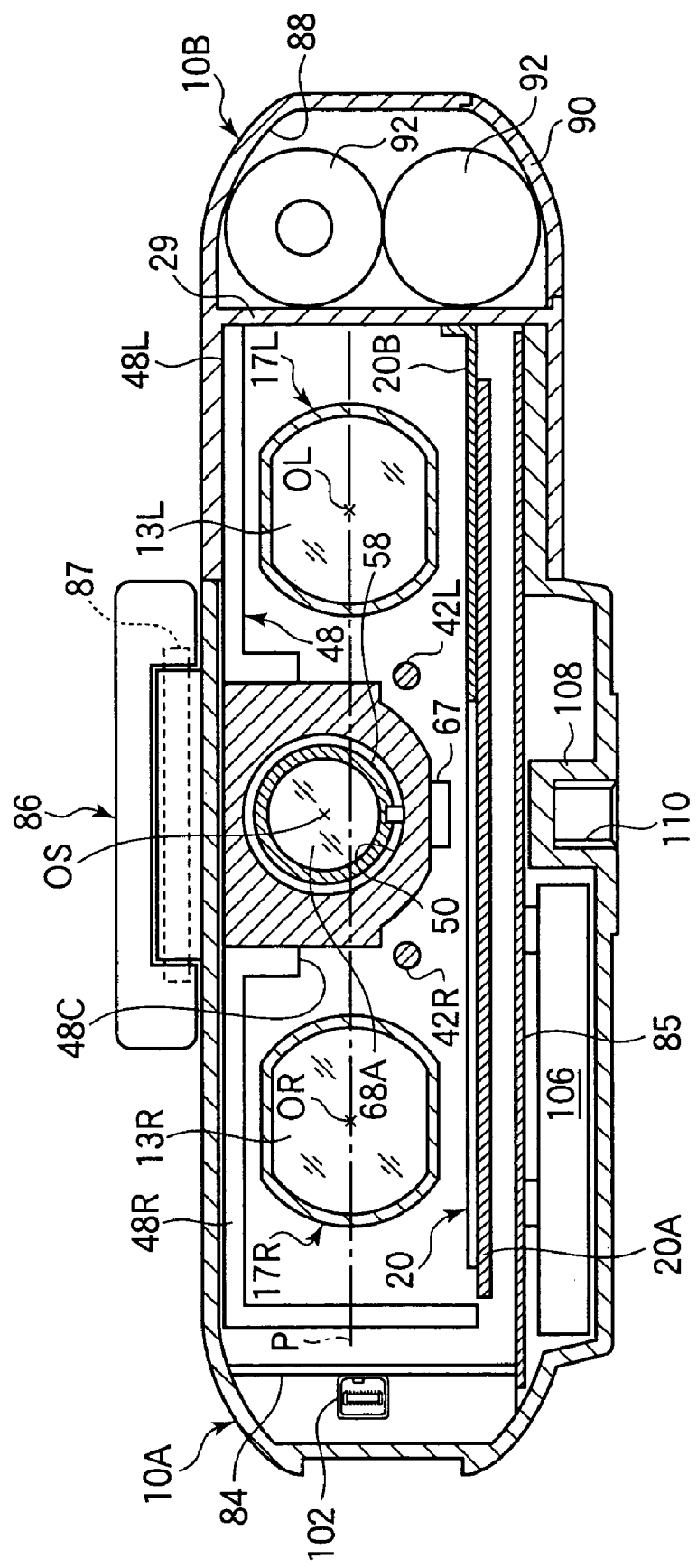
FIG. 2 is a sectional view along line II—II of FIG. 1.

FIG. 1 shows an internal structure of a binocular telescope with a photographing function, to which an embodiment of the present invention is applied. FIG. 2 is a sectional view along line II—II of FIG. 1, and in FIG. 2, some elements are omitted so as to simplify the drawing. In the embodiment, the binocular telescope has a casing 10, which comprises a main casing section 10A and a movable casing section 10B.

A pair of telescopic optical systems (or observation optical systems) 12R and 12L are provided in the casing 10. The telescopic optical systems 12R and 12L have a symmetrical structure, and are used for a right telescopic optical system and a left telescopic optical system. The right telescopic optical system 12R is mounted in the main casing section 10A, and contains an objective lens system 13R, an erecting prism system 14R, and an ocular lens system 15R. An observation window 16R is formed in a front wall of the main casing section 10A, and is aligned with the objective lens system 13R. The left telescopic optical system 12L is mounted in the movable casing section 10B, and contains an objective lens system 13L, an erecting prism system 14L, and an ocular lens system 15L. An observation window 16L is formed in a front wall of the movable casing section 10B, and is aligned with the objective lens system 13L.

Note that for simplicity of explanation, in the following description, front and back are respectively defined as a side of the objective lens system and a side of the ocular lens system, relative to the pair of telescopic optical systems 12R and 12L, and right and left are respectively defined as the right side and the left side when facing the ocular lens systems 15R and 15L.

The movable casing section 10B is slidably engaged with the main casing section 10A such that the movable casing section 10B can be linearly moved relative to the main casing section 10A. Namely, the movable casing section 10B is movable between a retracted position shown in FIGS. 1 and 2, and a maximum-extended position in which the movable casing section 10B is pulled out from the retracted position, shown in FIGS. 3 and 4. A suitable friction force acts on the sliding surfaces of both the casing sections 10A and 10B, and thus a certain extension or contraction force must be exerted on the movable casing section 10B before the movable casing section 10B can be extended from or contracted onto the main casing section 10A. Thus, it is possible for the movable casing section 10B to hold or stay still at an optical position between the fully retracted position (FIGS. 1 and 2) and the maximum-extended position (FIGS. 3 and 4), due to the suitable friction force acting on the sliding surface of both the casing sections 10A and 10B.

Figure 3:
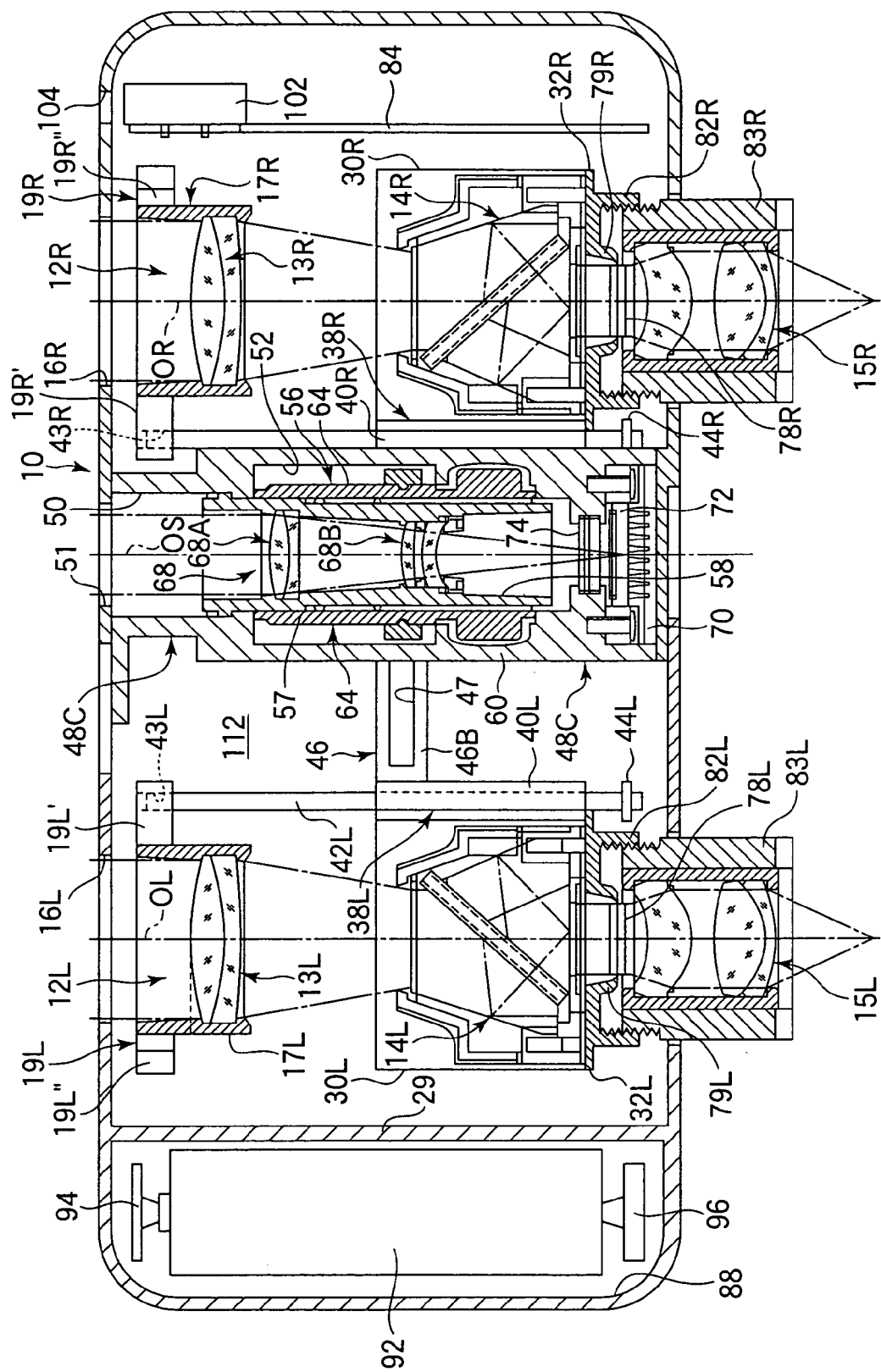
FIG. 3 is a horizontal sectional view similar to FIG. 1, the movable casing section being set at a maximum-extended position.
Figure 4:
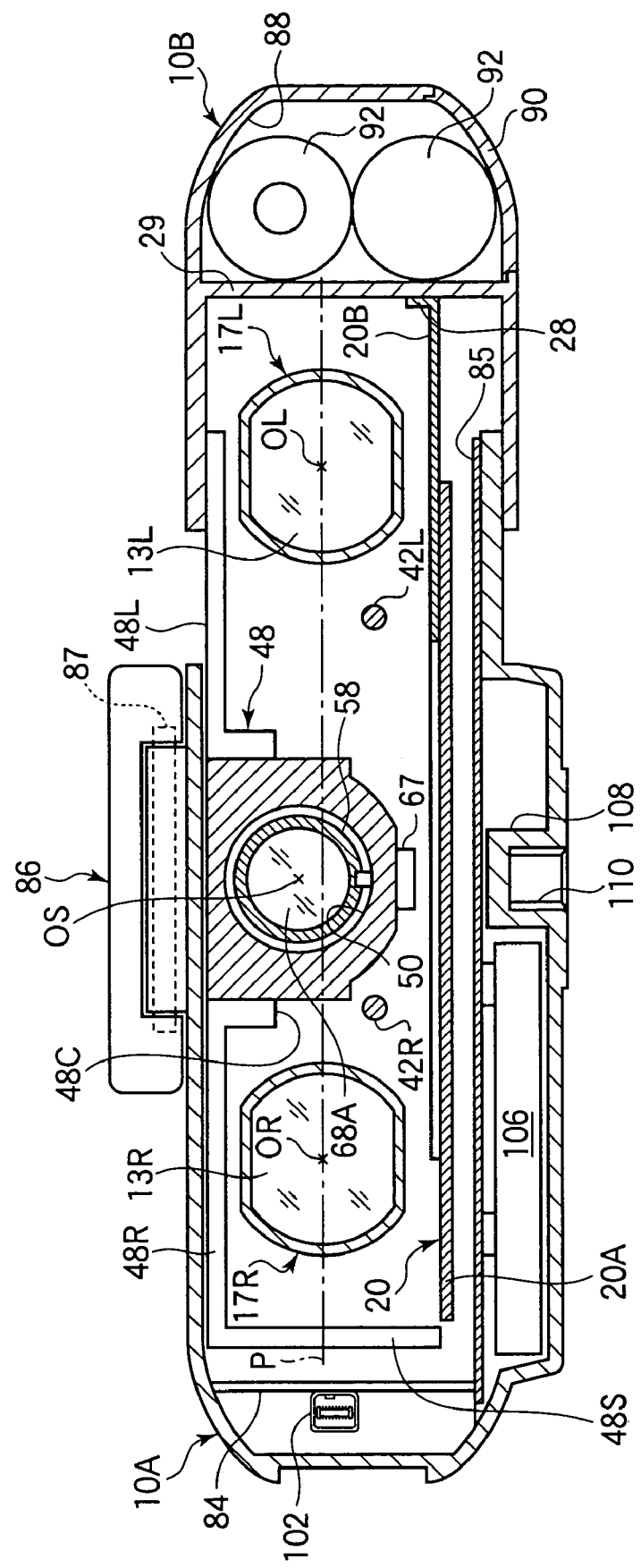
FIG. 4 is a horizontal sectional view similar to FIG. 2, the movable casing section being set at a maximum-extended position.

As understood from the comparison between FIGS. 1 and 2, and FIGS. 3 and 4, when the movable casing section 10B is pulled out from the main casing section 10A, the left telescopic optical system 12L is moved together with the movable casing section 10B, while the right telescopic optical system 12R is held in the main casing section 10A. Thus, by positioning the movable casing section 10B at an arbitrary extended position relative to the main casing section 10A, the distance between the optical axes of the ocular lens systems 15R and 15L, i.e., the interpupillary distance is adjusted. When the movable casing section 10B is set at the retracted position relative to the main casing section 10A, the distance between the telescopic optical systems 12R and 12L becomes the minimum (FIGS. 1 and 2), and when the movable casing section 10B is set at the maximum-extended position relative to the main casing section 10A, the distance between the telescopic optical systems 12R and 12L becomes the maximum (FIGS. 3 and 4).

The objective lens system 13R of the right telescopic optical system 12R is housed in a lens barrel 17R, which is mounted at a fixed position relative to the main casing section 10A, and the erecting prism system 14R and the ocular lens system 15R can be moved back and forth with respect to the objective lens system 13R, so that the right telescopic optical system 12R can be focused. Similarly, the objective lens system 13L of the left telescopic optical system 12L is housed in a lens barrel 17L, which is mounted at a fixed position relative to the movable casing section 10B, and the erecting prism system 14L and the ocular lens system 15L can be moved back and forth with respect to the objective lens system 13L, so that the left telescopic optical system 12L can be focused.

The lens barrel 17R has a cylindrical portion 18R, in which the objective lens system 13R is housed, and an attaching base 19R integrally formed under the cylindrical portion 18R. The attaching base 19R has an inside attaching portion 19R' extending toward the center of the casing 10 from the cylindrical portion 18R, and an outside attaching portion 19R" extending toward the outside of the casing 10 from the cylindrical portion 18R. The inside attaching portion 19R' is a side block portion having a relatively large thickness, and the outside attaching portion 19R" is a flat portion.

Similarly, the lens barrel 17L has a cylindrical portion 18L, in which the objective lens system 13L is housed, and an attaching base 19L integrally formed under the cylindrical portion 18L. The attaching base 19L has an inside attaching portion 19L' extending toward the center of the casing 10 from the cylindrical portion 18L, and an outside attaching portion 19L" extending toward the outside of the casing 10 from the cylindrical portion 18L. The inside attaching portion 19L' is a side block portion having a relatively large thickness, and the outside attaching portion 19L" is a flat portion.

Figure 5:
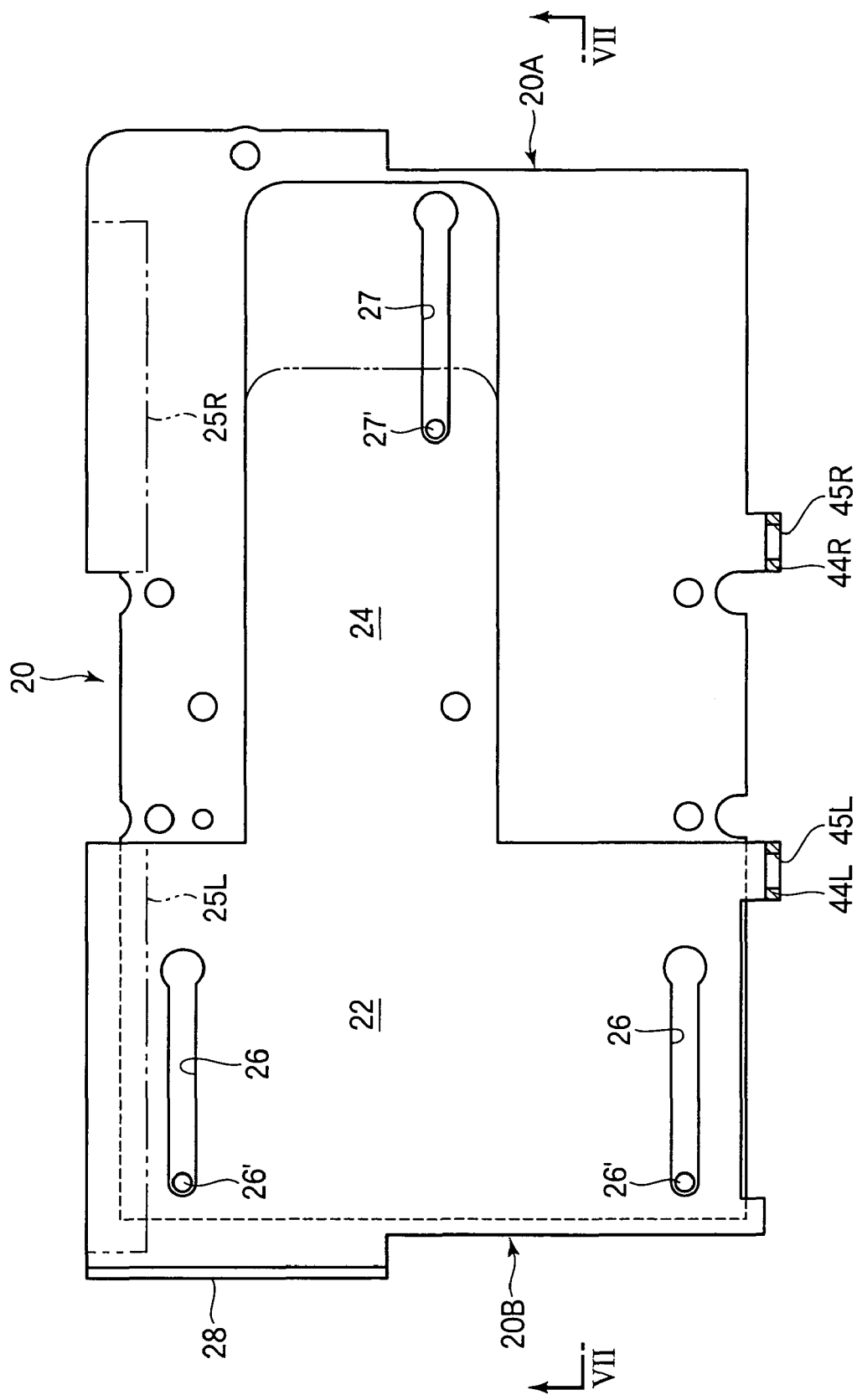
FIG. 5 is a plan view showing an optical system mount plate provided in a casing of the optical device shown in FIG. 1.

To perform the interpupillary distance adjusting operation and the focusing operation described above, an optical system mount plate 20 shown in FIG. 5 is provided on a bottom side of the casing 10. Note that, in FIGS. 1 and 3, the optical system mount plate 20 is omitted for the simplicity of the drawings.

The optical system mount plate 20 is composed of a rectangular plate 20A, fixed to the main casing section 10A, and a slide plate 20B slidably disposed on the rectangular plate 20A and fixed to the movable casing section 10B. The rectangular plate 20A and the slide plate 20B are made of appropriate metal material, preferably, a light metal, such as aluminum or aluminum alloy.

The slide plate 20B has a rectangular portion 22, having approximately the same breadth as the rectangular plate 20A, and an extending portion 24, integrally connected to and extending rightward from the rectangular portion 22. The attaching base 19R of the lens barrel 17R is fixed at a predetermined position on the rectangular plate 20A, and the attaching base 19L of the lens barrel 17L is fixed at a predetermined position on the rectangular portion 22 of the slide plate 20B. Note that, in FIG. 5, the fixed position of the attaching base 19R of the lens barrel 17R is indicated as an area enclosed by chain double-dashed line 25R, and the fixed position of the attaching base 19L of the lens barrel 17L is indicated as an area enclosed by chain double-dashed line 25L.

A pair of guide slots 26 are formed in the rectangular portion 22 of the slide plate 20B, and another guide slot 27 is formed in the extending portion 24. A pair of guide pins 26', slidably engaged with the guide slots 26, and guide pin 27', slidably engaged with the guide slot 27, are fixed on the rectangular plate 20A. The guide slots 26 and 27 are parallel to each other, and extend in the right and left direction by the same length. The length of each of the guide slots 26 and 27 corresponds to a movable distance of the movable casing section 10B relative to the main casing section 10A, i.e., the distance between the retracted position of the movable casing section 10B (FIGS. 1 and 2) and the maximum-extended position of the movable casing section 10B (FIGS. 3 and 4).

As understood from FIGS. 2 and 4, the optical system mount plate 20 is placed in the casing 10, and separated from the bottom of the casing 10 to form a space therein. The rectangular plate 20A is fixed to the main casing section 10A, and the slide plate 20B is fixed to the movable casing section 10B. Note that, for fixing the slide plate 20B to the movable casing section 10B, a flange 28, extending along the left side edge of the rectangular portion 22, is provided, and fixed on a partition 29 formed in the movable casing section 10B.

Figure 6:
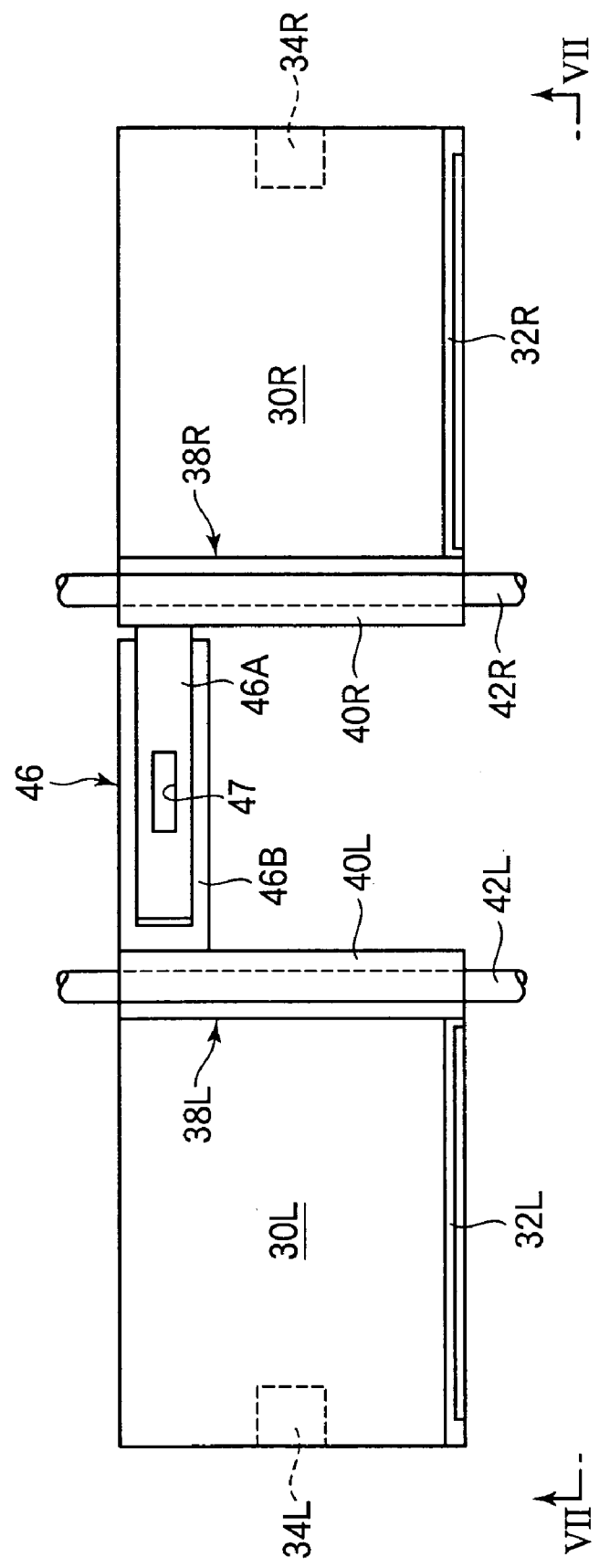
FIG. 6 is a plan view showing right and left mount plates which are disposed on the optical system mount plate shown in FIG. 5.
Figure 7:
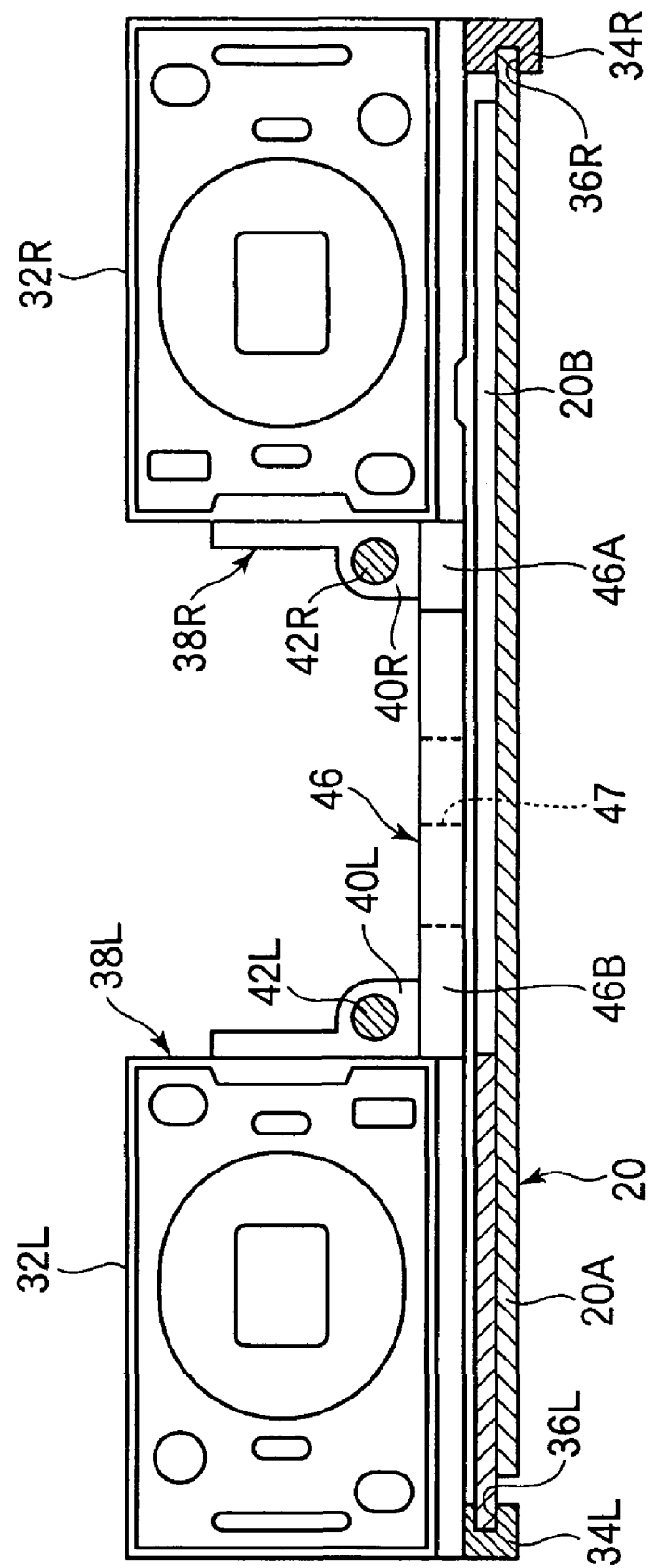
FIG. 7 is an elevational view observed along line VII—VII of FIG. 6, in which the optical system mount plate is indicated as a sectional view along line VII—VII of FIG. 5.

FIGS. 6 and 7 show a right mount plate 30R and a left mount plate 30L. The right mount plate 30R is provided for mounting the erecting prism system 14R of the right telescopic optical system 12R, and the left mount plate 30L is provided for mounting the erecting prism system 14L of the left telescopic optical system 12L. Upright plates 32R and 32L are provided along the rear peripheries of the right and left mount plates 30R and 30L. As shown in FIGS. 1 and 3, the right ocular lens system 15R is attached to the upright plate 32R, and the left ocular lens system 15L is attached to the upright plate 32L.

As shown in FIGS. 6 and 7, the right mount plate 30R is provided with a guide shoe 34R secured to the underside thereof in the vicinity of the right side edge thereof. The guide shoe 34R is formed with a groove 36R, which slidably receives a right side edge of the rectangular plate 20A, as shown in FIG. 7. Similarly, the left mount plate 30L is provided with a guide shoe 34L secured to the underside thereof in the vicinity of the left side edge thereof. The guide shoe 34L is formed with a groove 36L, which slidably receives a right side edge of the rectangular plate 20B, as shown in FIG. 7.

Note that since FIG. 7 is a sectional view along line VII—VII of FIG. 6, the optical system mount plate 20 should not be indicated in FIG. 7. Nevertheless, for the simplicity of the explanation, in FIG. 7, the optical system mount plate 20 is indicated as a section along line VII—VII of FIG. 5, and the guide shoes 34R and 34L are indicated as sectional views.

As shown in FIGS. 6 and 7, the right mount plate 30R has a side wall 38R provided along a left side edge thereof, and a lower portion of the side wall 38R is formed as a swollen portion 40R having a through bore for slidably receiving a guide rod 42R. The front end of the guide rod 42R is inserted in a hole 43R formed in the inside attaching portion 19R' of the attaching base 19R, and is fixed thereto. The rear end of the guide rod 42R is inserted in a hole 45R formed in an upright fragment 44R integrally formed on a rear edge of the rectangular plate 20A, and is fixed thereto (see FIG. 5). Note that, in FIG. 5, the upright fragment 44R is indicated as a sectional view so that the hole 45R is observed, and in FIGS. 1 and 3, the rear end of the guide rod 42R is inserted in the hole 45R of the upright fragment 44R.

Similarly, the left mount plate 30L has a side wall 38L provided along a right side edge thereof, and a lower portion of the side wall 38L is formed as a swollen portion 40L having a through bore for slidably receiving a guide rod 42L.

The front end of the guide rod 42L is inserted in a hole 43L formed in the inside attaching portion 19L' of the attaching base 19L, and is fixed thereto. The rear end of the guide rod 42L is inserted in a hole 45L formed in an upright fragment 44L integrally formed on a rear edge of the rectangular plate 20B, and is fixed thereto. Note that, similarly to the upright fragment 44R, in FIG. 5, the upright fragment 44L is indicated as a sectional view so that the hole 45L is observed, and in FIGS. 1 and 3, the rear end of the guide rod 42L is inserted in the hole 45L of the upright fragment 44L.

The objective lens system 13R of the right telescopic optical system 12R is disposed at a stationary position in front of the right mount plate 30R. Therefore, when the right mount plate 30R is moved back and forth along the guide rod 42R, the distance between the objective lens system 13R and the erecting prism system 14R is adjusted, so that a focusing operation of the right telescopic optical system 12R is performed. Similarly, since the objective lens system 13L of the left telescopic optical system 12L is disposed at a stationary position in front of the left mount plate 30L, by moving the left mount plate 30L back and forth along the guide rod 42L, the distance between the objective lens system 13L and the erecting prism system 14L is adjusted, so that a focusing operation of the left telescopic optical system 12L is performed.

In order to simultaneously move the right and left mount plates 30R and 30L along the guide rods 42R and 42L such that a distance between the right and left mount plates 30R and 30L is variable, the mount plates 30R and 30L are interconnected to each other by an expandable coupler 46, as shown in FIGS. 6 and 7.

In particular, the expandable coupler 46 includes a rectangular lumber-like member 46A, and a forked member 46B in which the lumber-like member 46A is slidably received. The lumber-like member 46A is securely attached to the underside of the swollen portion 40R of the side wall 38R at the forward end thereof, and the forked member 46B is securely attached to the underside of the swollen portion 40L of the side wall 38L at the forward end thereof. Both members 46A and 46B have a length which is greater than the distance of movement of the movable casing section 10B, between its retracted position (FIGS. 1 and 2) and its maximum extended position (FIGS. 3 and 4). Namely, even though the movable casing section 10B is extended from the retracted position to the maximum extended position, slidable engagement is maintained between the members 46A and 46B.

Figure 8:
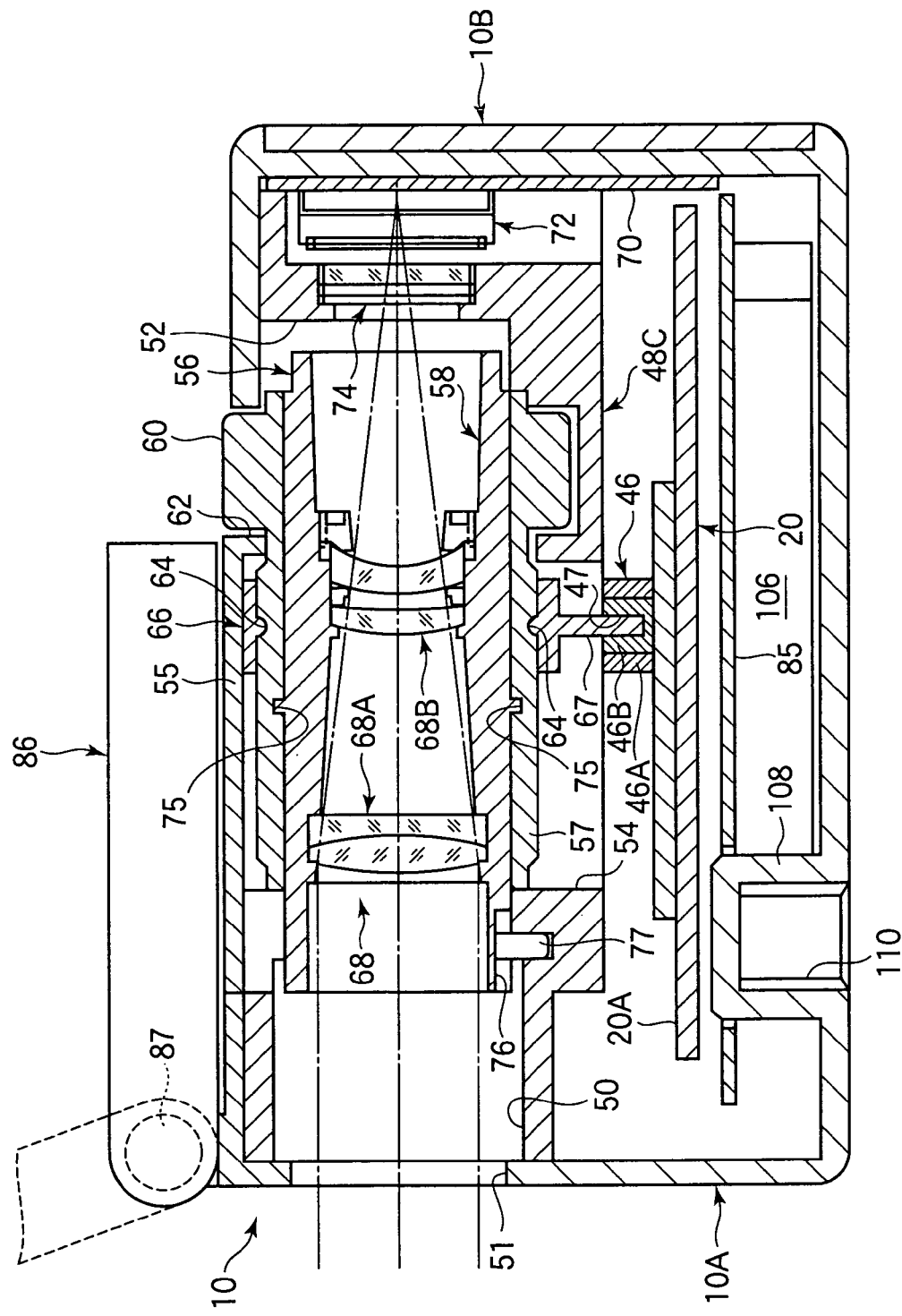
FIG. 8 is an elevational view observed along line VIII—VIII of FIG. 1.

With reference to FIG. 8, there is shown a vertical sectional view along line VIII—VIII of FIG. 1. As understood from FIGS. 2, 4, and 8, an inner frame 48 is housed in the casing 10, and is fixed to the main casing section 10A and the rectangular plate 20A. The inner frame 48 has a central portion 48C, a right wing portion 48R extending from the central portion 48C rightward, a vertical wall 48S extending from a right periphery of the right wing portion 48R downward, and a left wing portion 48L extending from the central portion 48C leftward.

As shown in FIG. 8, a bore 50 is formed in a front end portion of the central portion 48C, and is aligned with a circular window 51 formed in a front wall of the main casing section 10A. A recess 52 is formed in a rear portion in the central portion 48C, and a rectangular opening 54 is formed in a bottom of the recess 52. A top wall of the main casing section 10A is provided with an opening for exposing the recess 52, and the opening is closed by a cover plate 55 which can be removed from the opening.

A tubular assembly 56 is assembled in the recess 52 while the cover plate 55 is removed. The tubular assembly 56 has a rotary wheel cylinder (i.e., rotary wheel member) 57 and a lens barrel 58 disposed coaxially in the rotary wheel cylinder 57. The rotary wheel cylinder 57 is rotatably supported in the recess 52, and the lens barrel 58 can be moved along the central axis thereof while the lens barrel 58 is kept still so as not to rotate about the central axis. After assembling the tubular assembly 56, the cover plate 55 is fixed to cover the recess 52. A rotary wheel 60 is provided on the rotary wheel cylinder 57. The rotary wheel 60 has an annular projection formed on an outer surface of the rotary wheel cylinder 57, and the rotary wheel 60 exposes outside the top wall of the main casing section 10A through an opening 62 formed in the cover plate 55.

Four helicoid cam grooves 64, spaced at a constant interval with respect to each other, are formed on an outer surface of the rotary wheel cylinder 57, and an annular member 66 is threadingly fit on the helicoid cam grooves 64. Namely, four projections, engaged with the helicoid cam grooves 64 of the rotary wheel cylinder 57, are formed on an inner wall of the annular member 66, and disposed at a constant interval. Thus, the annular member 66 is threadingly fit on the helicoid cam grooves 64 through the projections.

A flat surface is formed on an outer periphery of the annular member 66, and is slidably engaged with an inner wall of the cover plate 55. Namely, when the rotary wheel cylinder 57 is rotated, the annular member 66 is not rotated due to the engagement of the flat surface and the inner wall of the cover plate 55, and is kept in a non-rotational state. Thus, when the rotary wheel cylinder 57 is rotated, the annular member 66 is moved along the central axis of the rotary wheel cylinder 57 due to the threading contact of the projections and the helicoid cam grooves 64, and the moving direction depends on the rotational direction of the rotary wheel cylinder 57.

A tongue 67 is projected from the annular member 66, and is positioned at an opposite side of the flat surface of the annular member 66. As shown in FIG. 8, the tongue 67 is projected from the rectangular opening 54 of the central portion 48C, and is inserted in a hole 47 formed in the rod member 46A. Therefore, when a user rotates the rotary wheel cylinder 57 by contacting the exposed portion of the rotary wheel 60 with a finger, for example, the annular member 66 is moved along the central axis of the rotary wheel cylinder 57, as described above, so that the mount plates 30R and 30L are moved along the optical axes of the telescopic optical systems 12R and 12L. Thus, the rotational movement of the rotary wheel 60 is converted into linear movements of the erecting prism systems 14R and 14L, and the ocular lens systems 15R and 15L, so that the telescopic optical systems 12R and 12L can be focused.

A photographing optical system 68 is provided in the lens barrel 58, which is coaxially disposed in the rotary wheel cylinder 57. The photographing optical system 68 has a first lens group 68A and a second lens group 68B. A circuit board 70 is attached on an inner surface of a rear end wall of the main casing section 10A. A solid-state imaging device such as a CCD 72 is mounted on the circuit board 70, and a light-receiving surface of the CCD 72 is aligned with the photographing optical system 68. An opening is formed in a rear end portion of the central portion 48C of the inner frame 48, and is aligned with the optical axis of the photographing optical system 68. An optical low-pass filter 74 is fit in the opening. Thus, the binocular telescope of this embodiment has the same photographing function as a digital camera, so that an object image obtained by the photographing optical system 68 is formed on the light-receiving surface of the CCD 72 as an optical image, which is photoelectrically converted into one frame's worth of image signals.

In FIGS. 1 through 4, the optical axis of the photographing optical system 68 is indicated by the reference OS, and the optical axes of the right and left telescopic optical systems 12R and 12L are indicated by references OR and OL. The optical axes OR and OL are parallel to each other, and to the optical axis OS of the photographing optical system 68. As shown in FIGS. 2 and 4, the optical axes OR and OL define a plane P which is parallel to the optical axis OS of the photographing optical system 68. The right and left telescopic optical systems 12R and 12L can be moved parallel to the plane P, so that the distance between the optical axes OR and OL, i.e., the interpupillary distance, can be adjusted.

The binocular telescope with a photographing function of the embodiment is constructed, similar to the usual digital camera, in such a manner that a near object, which is situated at 2 meters ahead of the binocular telescope, for example, can be photographed, and due to this, a focusing mechanism is assembled between the rotary wheel cylinder 57 and the lens barrel 58. Namely, four helicoid cam grooves 75 are formed on an inner wall of the rotary wheel cylinder 57, and four projections, which are cam followers engaged with the helicoid cam grooves 75, are formed on an outer wall of the lens barrel 58.

On the other hand, the front end of the lens barrel 58 is inserted in the bore 50, and a bottom portion of the front end is formed with a key groove 76, which extends from the front end of the lens barrel 58 in the longitudinal direction by a predetermined length. A hole is formed in a bottom portion of the front end of the inner frame 48, and a pin 77 is planted in the hole to engage with the key groove 76. Thus, by the engagement of the key groove 76 and the pin 77, the rotation of the lens barrel 58 is prevented.

Therefore, when the rotary wheel cylinder 57 is rotated by an operation of the rotary wheel 60, the lens barrel 58 is moved along the optical axis of the photographing optical system 68. Thus, the helicoid cam grooves 75 formed on the inner wall of the rotary wheel cylinder 57 and the projection or cam follower formed on the outer wall of the lens barrel 58 form a movement-conversion mechanism that converts a rotational movement of the rotary wheel 57 into a linear movement or focusing movement of the lens barrel 58.

Figure 9:
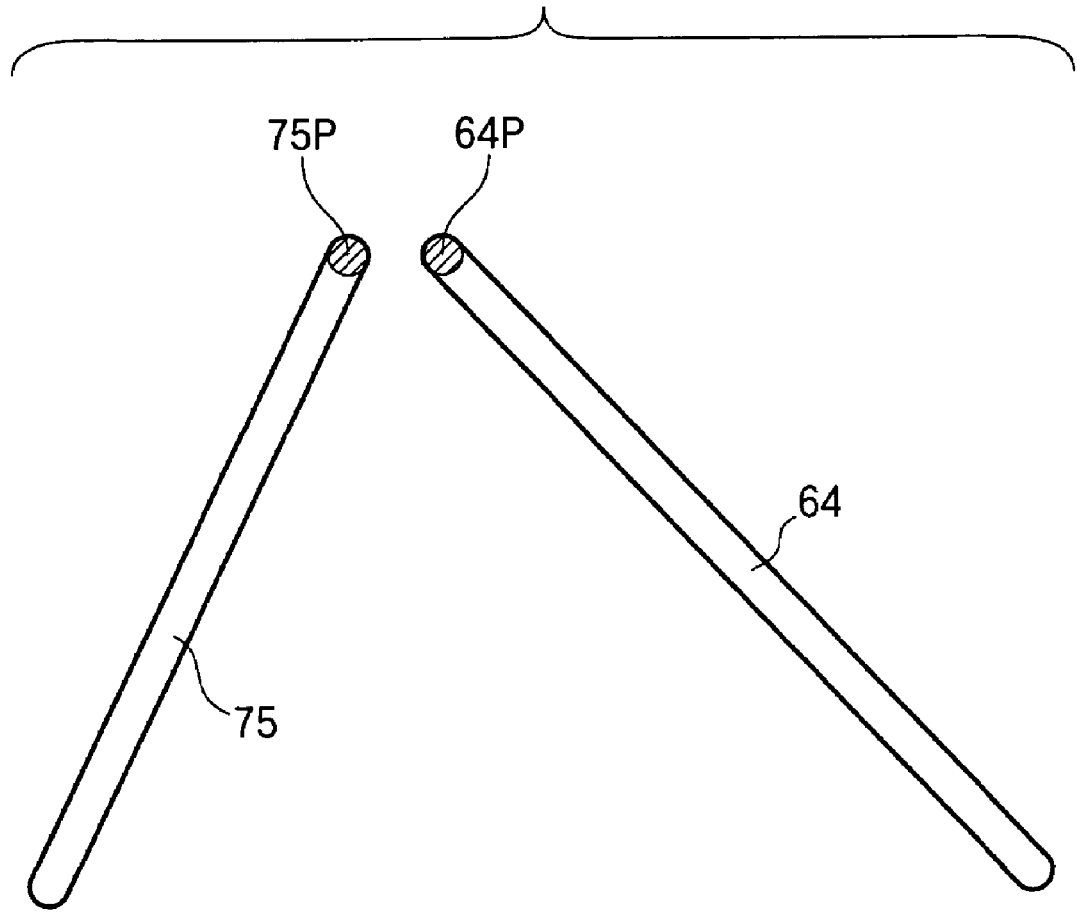
FIG. 9 is a development showing helicoid cam grooves formed on an outer surface and an inner surface of a rotary wheel cylinder mounted in the binocular telescope with a photographing function.

FIG. 9 shows a developing view in which the helicoid cam grooves 64 and 75 formed on the outer wall and the inner wall of the rotary wheel cylinder 57 are developed in a flat plane. In this drawing, the projection 64P of the annular member 66 is engaged with the helicoid cam groove 64, and the projection 75P of the lens barrel 58 is engaged with the helicoid cam groove 75.

As understood from FIG. 9, the helicoid cam groove 64 formed on the outer wall of the rotary wheel cylinder 57 and the helicoid cam groove 75 formed on the inner wall of the rotary wheel cylinder 57 are inclined in the opposite direction to each other. Namely, when the rotary wheel cylinder 57 is rotated in such a manner that the erecting prism systems 14R and 14L and the ocular lens systems 15R and 15L are separated from the objective lens systems 13R and 13L, the lens barrel 58 is moved to separate from the CCD 72. Due to this, an image of a near object can be focused on the light-receiving surface of the CCD 72. The shape of the helicoid cam groove 64 of the outer wall of the rotary wheel cylinder 57 and the shape of the helicoid cam groove 75 of the inner wall are different from each other in accordance with the optical characteristics of the pair of telescopic optical systems 12R and 12L and the photographing optical system 68.

When the pair of telescopic optical systems 12R and 12L focus on an object at infinity, the lens barrel 58 is positioned at its closest position to the light-receiving surface of the CCD 72, and each of the projections 64P and 75P are engaged with an end, corresponding to the infinity, of each of the helicoid cam grooves 64 and 75, as shown in FIG. 9.

When a near object is to be observed by the pair of telescopic optical systems 12R and 12L, the rotary wheel 60 is rotated so that the erecting prism systems 14R and 14L and the ocular lens systems 15R and 15L are separated from the objective lens systems 13R and 13L. Thus, the telescopic optical systems 12R and 12L focus on the object, and the photographing optical system 68 is operated in association with the telescopic optical systems 12R and 12L to focus on the object. Namely, the helicoid cam grooves 64 and 75 are formed in such a manner that the photographing optical system 68 focuses on the object when the pair of telescopic optical systems 12R and 12L focus on the object due to the rotation of the rotary wheel 57.

Thus, if an observed object is observed by the pair of telescopic optical systems 12R and 12L as a focused image, an image to be photographed, corresponding to the observed object, is formed on the light-receiving surface of the CCD 72 as a focused image. However, even if the observed object is observed through the pair of telescopic optical systems 12R and 12L in an in-focus state, the telescopic optical systems 12R and 12L are not necessarily focused with the same dioptric power. This is because human eyes have the ability to adjust their focusing state, by which the observed object can be observed in an in-focus state even if the position of the image is offset from the in-focus position. Namely, even if the dioptric power of the pair of the telescopic optical systems 12R and 12L is offset from the proper value, the human eye can observe the object as a focused image through the pair of the telescopic optical systems 12R and 12L.

For resolving the problem described above, in the embodiment, as shown in FIGS. 1 and 3, both of the telescopic optical systems 12R and 12L are provided with reticle elements 78R and 78L. In detail, the upright plate 32R of the right mount plate 30R is provided with an aperture 79R which defines a field of view of the right telescopic optical system 12R as a rectangle, and the reticle element 78R is provided in the aperture 79R. Similarly, the upright plate 32L of the right mount plate 30L is provided with an aperture 79L which defines a field of view of the left telescopic optical system 12L as a rectangle, and the reticle element 78L is provided in the aperture 79L. The apertures 79R and 79L have, an identical structure, and the reticle elements 78R and 78L are positioned close to the front focal points of the ocular lens systems 15R and 15L.

Figure 10:
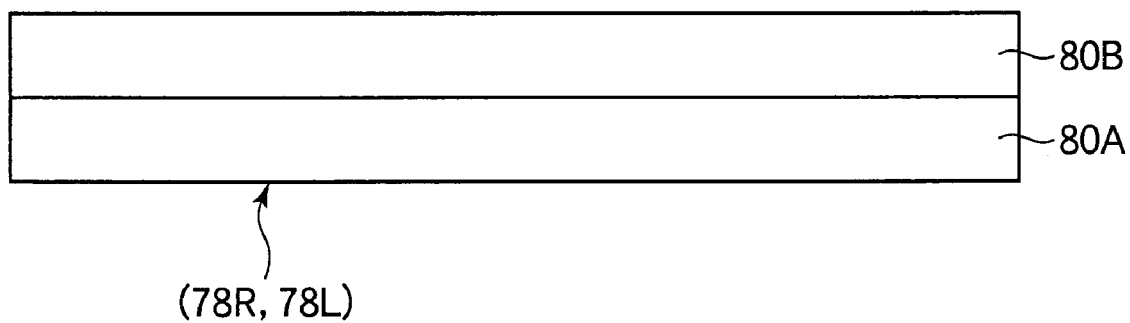
FIG. 10 is a plan view showing a reticle element provided in a pair of telescopic optical systems.

Each of the reticle elements 78R and 78L is formed by applying a pair of glass plates 80A and 80B to each other, as shown in FIG. 10. A rectangular field of view, defined by each of the apertures 79R and 79L, is formed on each of the glass plates 80A and 80B, and a reticle is formed on the plane formed between the glass plates 80A and 80B. For example, a reticle 81R as shown in FIG. 11, is formed between the glass plates 80A and 80B of the right reticle element 78R, and a reticle 81L as shown in FIG. 12 is formed between the glass plates 80A and 80B of the left reticle element 78L.

The reticle elements 78R and 78L are formed as follows: First, the reticles 81R and 81L are formed on one of the glass plates 80A and 80B (the glass plates 80B, for example), by vacuum evaporation of a metal, such as aluminum. Then, for protecting the reticles 81R and 81L, the other glass plates 80A are applied to a surface of the glass plate 80B, on which the reticles 81R and 81L are formed, so that the reticle elements 78R and 78L are formed. Note that, when the reticle elements 78R and 78L are disposed in the apertures 79R and 79L, the boundary plane between the glass plates 80A and 80B (i.e., each of the reticles 81R and 81L) is placed to coincide with an aperture plane of each of the apertures 79R and 79L.

Figure 11:
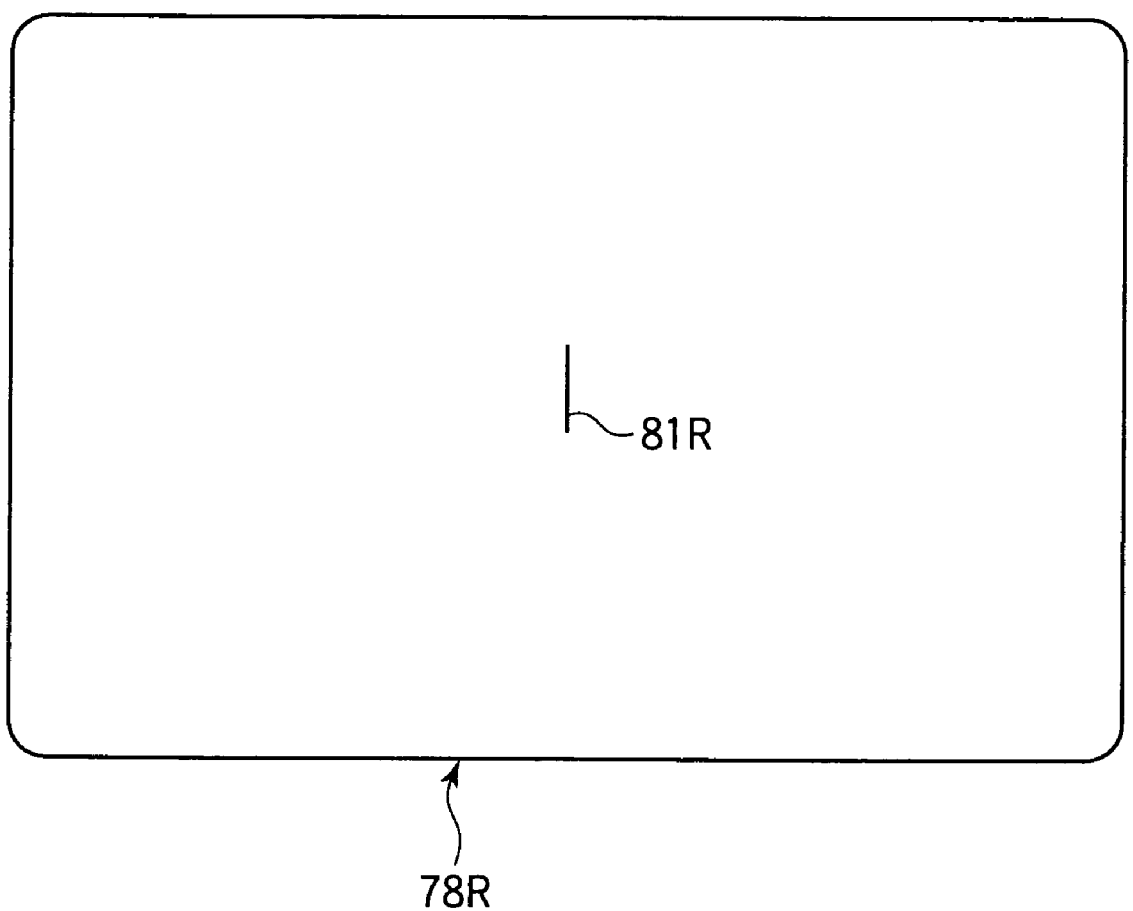
FIG. 11 is an elevational view of the reticle element shown in FIG. 10, and shows the right reticle element assembled in the right telescopic optical system.
Figure 12:
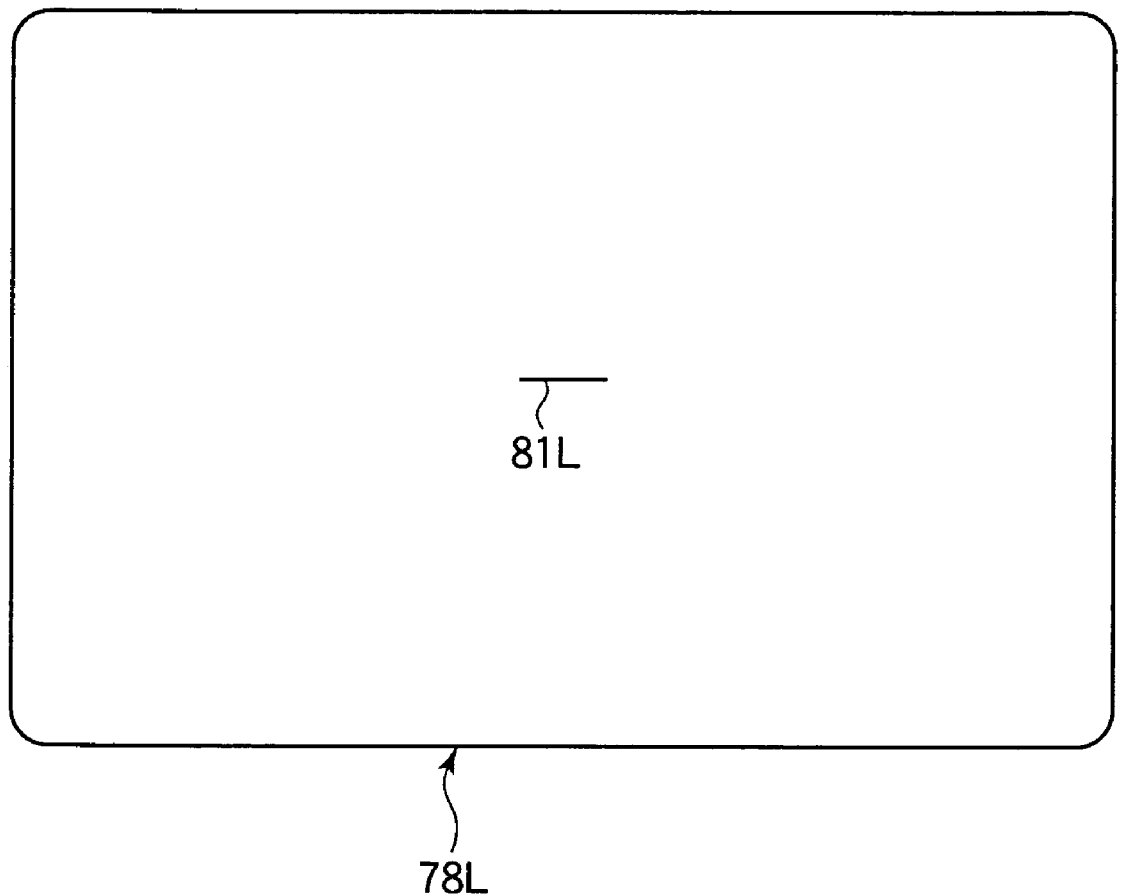
FIG. 12 is an elevational view of the reticle element shown in FIG. 10, and shows the left reticle element assembled in the left telescopic optical system.

In the example shown in FIG. 11, the reticle 81R is a line segment extending in the vertical direction in the field of view of the right telescopic optical system 12R. The vertical-line-segment reticle 81R crosses the optical axis of the right telescopic optical system 12R, and the optical axis is positioned at the center of the vertical-line-segment reticle 81R. In other words, it can be said that the vertical-line-segment reticle 81R is composed of two line segments which extend radially and vertically from the optical axis, by the same length. On the other hand, in the example shown in FIG. 12, the reticle 81L is a line segment extending in the horizontal direction in the field of view of the left telescopic optical system 12L. The horizontal-line-segment reticle 81L crosses the optical axis of the left telescopic optical system 12L, and the optical axis is positioned at the center of the horizontal-line-segment reticle 81L. In other words, it can be said that the horizontal-line-segment reticle 81L is composed of two line segments which extend radially and horizontally from the optical axis, by the same length. Note that the vertical line segment reticle 81R and the horizontal line segment reticle 81L have the same length.

When each of the telescopic optical systems 12R and 12L focuses on infinity with 0 diopter, although the rear focal points of the objective lens systems 13R and 13L are coincident with the front focal points of the ocular lens systems 15R and 15L, regarding a near object, the rear focal points of the objective lens systems 13R and 13L are offset from the front focal points of the ocular lens systems 15R and 15L. Therefore, it is necessary that the positions of the ocular lens systems 15R and 15L relative to the objective lens systems 13R and 13L are adjusted so that the rear focal points of the objective lens systems 13R and 13L are coincident with the front focal points of the ocular lens systems 15R and 15L, i.e., the in-focus position of 0 diopter.

In this focusing operation, the user tries to observe the observed object as an in-focus image at the reticles 81R and 81L, i.e., the front focal points of the ocular lens systems 15R and 15L, due to the reticles 81R and 81L. Therefore, when the observed object is observed in an in-focus state with the pair of telescopic optical systems 12R and 12L by the user, the observed image is formed in an in-focus state through the photographing optical system 68 as a photographed image. Thus, the observed image observed in an in-focus state through the pair of telescopic optical systems 12R and 12L can always be photographed in an in-focus state through the photographing optical system 68.

Each user has different sight characteristics, and even for the same user, the sight in the right and left eyes is different. Therefore, it is necessary to adjust the dioptric powers of the ocular lens systems 15R and 15L relative to the reticles 81R and 81L of the reticle elements 78R and 78L in accordance with the sight of the right and left eyes of the user, so that the reticles 81R and 81L can be observed in an in-focus state through the ocular lens systems 15R and 15L. Thus, for adjusting the dioptric power of each of the ocular lens systems 15R and 15L, the distances of the ocular lens systems 15R and 15L relative to the reticle elements 78R and 78L can be adjusted.

Namely, as shown in FIGS. 1 and 3, cylindrical portions 82R and 82L enclosing the apertures 79R and 79L are formed on the upright plates 32R and 32L of the right and left mount plates 30R and 30L, and female screws are formed on the inner surfaces of the cylindrical portions 82R and 82L. Male screws are formed on the outer surfaces of the lens barrels 83R and 83L holding the ocular lens systems 15R and 15L, and the lens barrels 83R and 83L are threaded in the cylindrical portions 82R and 82L. Thus, by rotating each of the lens barrels 83R and 83L in each of the cylindrical portions 82R and 82L, the distance of each of the ocular lens systems 15R and 15L relative to each of the aperture planes of the apertures 79R and 79L, i.e., the dioptric power of each of the ocular lens systems 15R and 15L, can be adjusted. Note that, since grease having a high viscosity is provided between the cylindrical portions 82R and 82L and the lens barrels 83R and 83L, the lens barrels 83R and 83L will not rotate unexpectedly.

For the dioptric power adjustment of the right ocular lens system 15R, first, the user looks or observes through the ocular lens system 15R with the right eye. If the cross index 81 is observed in an out-of-focus state, the user rotates the lens barrel 83R to adjust the position of the ocular lens system 15R until the cross index 81 can be observed in an in-focus state. In a similar way as the above, the dioptric power is adjusted for the left ocular lens system 15L. In this state, a focusing operation is carried out using the rotary wheel 60 while observing a near object through the pair of telescopic optical systems 12R and 12L. Then, if the object is observed as an in-focus image formed at the position of the reticles 81R and 81L, this means that the object is formed in an in-focus state as a photographed image for the photographing optical system 68. Thus, in the binocular telescope with a photographing function of the embodiment, the pair of telescopic optical systems 12R and 12L function not only as a telescope but also as a focusing mechanism for the photographing optical system 68.

When the observed object is observed through the pair of telescopic optical systems 12R and 12L, by making the distance between the optical axes of the pair of telescopic optical systems 12R and 12L coincide with the interpupillary distance of the user, the right observed object image observed through the right telescopic optical system 12R and the left observed object image observed through the left telescopic optical system 12L are fused. Due to this, the user observes both the observed object images as a single image, and the right and left reticles 81R and 81L are fused so that a single reticle image, formed by superposing the right and left reticles on each other, is observed.

Here, it is supposed that the right and left reticles have completely identical shapes, and are placed at the same relative positions with respect to the telescopic optical systems 12R and 12L. As shown in FIG. 13A, for example, if the right and left reticles are cross indexes 81R' and 81L', which have the same shapes and are placed at the same relative positions with respect to the optical axes of the telescopic optical systems 12R and 12L, both of the cross indexes 81R' and 81L' are fused to superpose on each other, so that a single cross index 81RL' should be observed.

However, as a matter of fact, it is impossible that both of the cross indexes 81R' and 81L' are fused to superpose completely on each other. This is because, when taking into consideration manufacturing accuracies and assembly errors of components of the binocular telescope with a photographing function, it is impossible for both of the observed object images to be fused in such a manner that the optical axes of the pair of telescopic optical systems 12R and 12L completely coincide with each other, by a interpupillary distance adjustment. Therefore, both of the cross indexes 81R' and 81L' are observed as cross indexes which are fused with a slight offset, as shown in FIG. 13B. Note that, in FIGS. 13A and 13B, the cross indexes 81R' and 81L' are exaggerated compared with reality, and if both of the cross indexes 81R' and 81L' appear in duplication as shown in FIG. 13B, it would be a distraction for the user.

In the embodiment, as shown in FIG. 14A, the reticle 81R is a vertical line segment, and the reticle 81L is a horizontal line segment, so that the vertical line segment reticle 81R and the horizontal line segment reticle 81L are fused to appear as a cross reticle 81RL in the field of view. Note that, in FIG. 14A, although both of the optical axes of the pair of telescopic optical systems 12R and 12L completely coincide with each other because of the interpupillary distance adjustment, so that the vertical line segment reticle 81R and the horizontal line segment reticle 81L are fused, in reality, a point of intersection of the vertical line segment reticle 81R and the horizontal line segment reticle 81L is offset from the optical axes. Nevertheless, the cross reticle 81RL obtained by fusing the vertical line segment reticle 81R and the horizontal line segment reticle 81L does not distract the user in comparison with the example shown in FIG. 13B.

FIG. 14B shows another example of the right and left reticles $81R_1$ and $81L_1$. In the example, the reticle $81R_1$ is formed by two line segments, which extend vertically and radially from a circular area encircling the optical axis of the telescopic optical system 12R, and the reticle $81L_1$ is formed by two line segments, which extend horizontally and radially from a circular area encircling the optical axis of the telescopic optical system 12L. A cross reticle $81RL_1$ obtained by fusing the reticles $81R_1$ and $81L_1$ does not distract the user.

Thus, each of the reticles formed on the reticle elements 78R and 78L is formed such that, when the optical axes of the pair of telescopic optical systems 12R and 12L are made completely coincide by adjusting the interpupillary distance of the optical axes to fuse the both of the reticles, each reticle is geometrically non-coordinate with the other. The geometrical non-coordinate condition means that the right and left reticles have completely the same shape, but are not positioned at the same relative position with respect to the telescopic optical systems 12R and 12L. In other words, it means that, when the optical axes of the pair of telescopic optical systems 12R and 12L are made completely coincident by adjusting the interpupillary distance of the optical axes, the right and left reticles are not significantly superposed with each other by fusing.

FIGS. 15A and 15B through 18A and 18B show examples of shapes of reticles which can be formed on the right and left reticle elements 78R and 78L. Further, for each example, when the optical axes of the pair of telescopic optical systems 12R and 12L are made to completely coincide by adjusting the interpupillary distance of the pair of telescopic optical systems 12R and 12L to fuse the reticles, the shapes become geometrically non-coordinate.

In FIG. 15A, the right reticle $81R_2$ is obtained by rotating the vertical line segment reticle 81R, shown in FIG. 14A, counterclockwise about the optical axis of the right telescopic optical system 12R, by 45 degrees. The left reticle $81L_2$ is obtained by rotating the horizontal line segment reticle 81L, shown in FIG. 14A, counterclockwise about the optical axis of the left telescopic optical system 12L, by 45 degrees. The reticle 81RL$_2$ obtained by fusing both of the reticles 81R$_2$ and 81L$_2$ does not distract the user.

Further, in FIG. 15B, the right reticle 81R$_3$ is obtained by rotating the reticle 81R$_1$, shown in FIG. 14B, counterclockwise about the optical axis of the right telescopic optical system 12R, by 45 degrees. The left reticle 81L$_3$ is obtained by rotating the horizontal line segment reticle 81L$_1$, shown in FIG. 14B, counterclockwise about the optical axis of the left telescopic optical system 12L, by 45 degrees. The reticle 81RL$_3$ obtained by fusing both of the reticles 81R$_3$ and 81L$_3$ does not distract the user.

In FIG. 16A, the right reticle 81R$_4$ is composed of two line segments, which are extended radially from a small circular area encircling the optical axis of the right telescopic optical system 12R. The line segments have line symmetry with respect to a horizontal line passing through the optical axis, and the angle between the line segments is 90 degrees. The left reticle 81L$_4$ is composed of two line segments, which are extended radially from a small circular area encircling the optical axis of the left telescopic optical system 12L. The line segments have line symmetry with respect to a horizontal line passing through the optical axis, and the angle between the line segments is 90 degrees. The reticle 81RL$_4$, obtained by fusing both of the reticles 81R$_4$ and 81L$_4$, is similar to the reticle 81RL$_3$ shown in FIG. 15B.

In FIG. 16B, the right reticle 81R$_5$ is a line segment, which is vertically extended and separated from the optical axis of the right telescopic optical system 12R to the right side, and the left reticle 81L$_5$ is a line segment, which is vertically extended and separated from the optical axis of the left telescopic optical system 12L to the left side. Both of the line segments have the same length, and the distance between each of the line segments and the optical axis of the corresponding telescopic optical system is identical. Thus, the reticle 81RL$_5$, obtained by fusing both of the reticles 81R$_5$ and 81L$_5$, is composed of the two vertical line segments, which are separated from each other, sandwiching the optical axis. Therefore, the reticle 81RL$_5$ does not distract the user.

The reticle does not necessarily need to be formed by line segments, but can be formed by a proper geometrical shape, as shown in FIGS. 17A and 17B.

In FIG. 17A, the right reticle 81R$_6$ is a circle, of which the center is positioned at the optical axis of the right telescopic optical system 12R, and the left reticle 81L$_6$ is a circle, of which the center is positioned at the optical axis of the left telescopic optical system 12L. Thus, the reticle 81RL$_6$, obtained by fusing both of the reticles 81R$_6$ and 81L$_6$, is a double circle the center of which is coincident with the optical axis. Actually, as described above, since the optical axes of the right and left telescopic optical systems 12R and 12L do not become completely coincident by interpupillary distance adjustment, the centers of the two circles are slightly offset from each other. However, the offset does not distract the user, in comparison with the example shown in FIG. 13B.

In FIG. 17B, the right reticle 81R$_7$ is a lozenge, of which the center is positioned at the optical axis of the right telescopic optical system 12R, and the left reticle 81L$_7$ is a lozenge, of which the center is positioned at the optical axis of the left telescopic optical system 12L. The former lozenge is lager than the latter lozenge. Thus, the reticle 81RL$_7$, obtained by fusing both of the reticles 81R$_7$ and 81L$_7$, is a double lozenge the center of which is coincident with the optical axis. Similarly to the example shown in FIG. 17A, although the centers of the two lozenges are slightly offset from each other, the offset does not distract the user, in comparison with the example shown in FIG. 13B.

The reticle does not have to be formed by a line segment or a geometrical figure. That is, the reticle can be formed by dots as shown in FIGS. 18A and 18B.

Figure 18A:
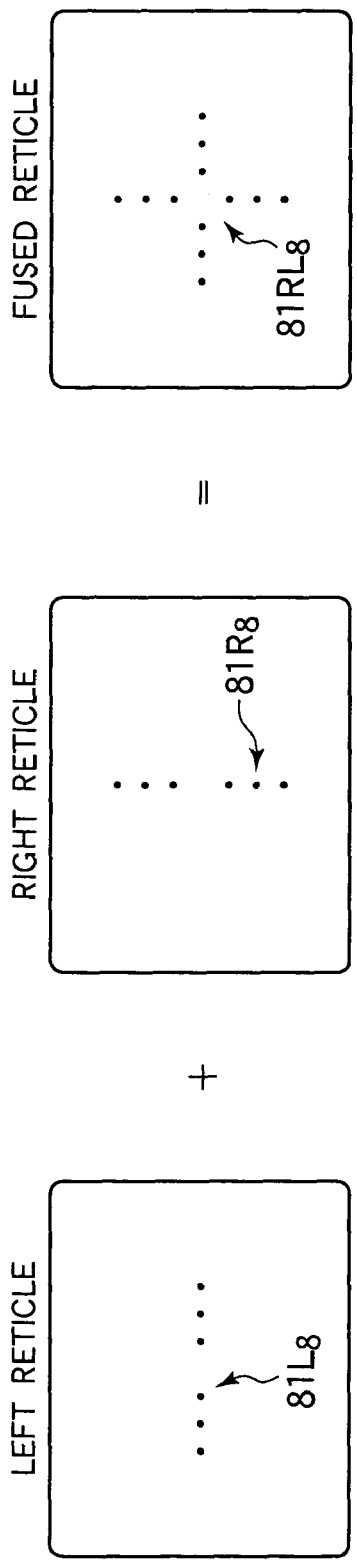
FIG. 18A is a view schematically showing a fused image of a ninth example of the right and left reticles.

In FIG. 18A, the right reticle 81R$_8$ is composed of a plurality of dots, which are arranged on a plane vertical to the optical axis OR of the right telescopic optical system 12R, and are aligned on a line extending in a vertical direction and passing through the optical axis OR. Namely, the dots are aligned on line segments which are symmetrical with respect to a horizontal straight line on the plane. The left reticle 81L$_8$ is composed to a plurality of dots, which are arranged on a plane vertical to the optical axis OL of the left telescopic optical system 12L, and are aligned on a line extending in a horizontal direction and passing through the optical axis OL. Namely, the dots are aligned on line segments which are symmetrical with respect to a vertical straight line on the plane. Thus, the reticle 81RL$_8$ obtained by fusing both of the reticles 81R$_8$ and 81L$_8$ is like a cross, composed of dots, and does not distract the user.

Figure 18B:
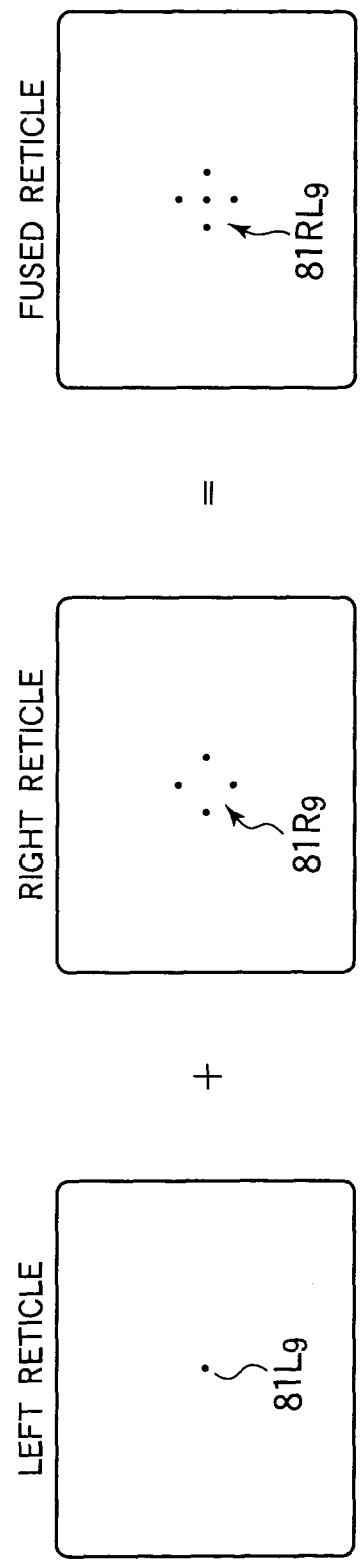
FIG. 18B is a view schematically showing a fused image of a tenth example of the right and left reticles.

In FIG. 18B, the right reticle 81R$_9$ is composed of four dots, which are arranged on a plane vertical to the optical axis OR of the right telescopic optical system 12R, and disposed around the optical axis OR and arranged at a constant distance from the optical axis OR. The left reticle 81L$_9$ is composed of a single dot which is aligned on the optical axis OL of the left telescopic optical system 12L. Thus, the reticle 81RL$_9$ obtained by fusing both of the reticles 81R$_9$ and 81L$_9$ is composed of the single center dot and the four dots disposed around the center dot, and does not distract the user.

Although some examples of the reticles which are formed on the right and left reticle elements 78R and 78L have been described, any reticle can be utilized if it satisfies the conditions described above. However, according to the sensitivity of a human, it is preferable that a reticle obtained by fusing the right and left reticles have symmetry with respect to the optical axis. For example, it can be said that all of the examples of the fused reticles shown in the drawings show dot symmetry with respect to an imaginary optical axis IA, defined by superposing the optical axes OR and OL of the pair of telescopic optical systems 12R and 12L, when the reticle images are fused (see FIGS. 14A and 14B). In the examples shown in FIGS. 14A and 14B, the fused reticles 81RL and 81RL$_1$ show line symmetry with respect to a straight line intersecting the vertical straight line, passing through the imaginary optical axis IA, at an angle of 45 degrees. In the examples shown in FIGS. 15A and 15B, the fused reticles 81RL$_2$ and 81RL$_3$ show line symmetry with respect to a vertical or horizontal straight line passing through the imaginary optical axis IA.

As shown in FIGS. 1 through 4, a power supply circuit board 84, which is relatively heavy, is provided in a right end portion of the main casing section 10A. As shown in FIGS. 2, 4, and 8, a control circuit board 85 is provided between the bottom of the main casing section 10A and the optical system mount plate 20, and is fixed on the bottom of the main casing section 10A. Electronic parts such as a CPU, a DSP, a memory, a capacitor, and so on are mounted on the control circuit board 85, and the circuit board 70 and the power supply circuit board 84 are connected to the control circuit board 85 through a flat flexible wiring cord (not shown).

In the embodiment, as shown in FIGS. 2, 4, and 8, an LCD monitor 86 is disposed on an upper surface of the top wall of the main casing section 10A. The LCD monitor 86 has a flat rectangular plate shape. The LCD monitor 86 is arranged in such a manner that its front and rear sides, positioned at opposite sides, are perpendicular to the optical axis of the photographing optical system 68, and the LCD monitor 86 is rotatable about a rotational shaft 87 provided along the front side. The LCD monitor 86 is usually folded or closed as shown by a solid line in FIG. 8. In this condition, since the display surface of the LCD monitor 86 faces an upper surface of the main casing section 10A, the display surface cannot be seen. Conversely, when a photographing operation is performed using the CCD 72, the LCD monitor 86 is rotated and raised from the folding position to a display position shown by a broken line in FIG. 8, so that the display surface of the LCD monitor 86 can be seen from the side of the ocular lens systems 15R and 15L.

The left end portion of the movable casing section 10B is divided by the partition 29, to form a battery chamber 88 in which batteries 92 are housed. As shown in FIGS. 2 and 4, a lid 90 is provided in a bottom wall of the battery chamber 88. By opening the lid 90, the batteries 92 can be mounted in or removed from the battery chamber 88. The lid 90 forms a part of the movable casing section 10B, and is fixed at a closing position shown in FIGS. 2 and 4 through a proper engaging mechanism.

The weight of the power supply circuit board 84 is relatively high, and similarly, the weights of the batteries 92 are relatively high. In the embodiment, two components having a relatively large weight are disposed in both ends of the casing 10. Therefore, the weight balance of the binocular telescope with a photographing function is improved.

As shown in FIGS. 1 and 3, electrode plates 94 and 96 are provided at front and rear portions of the battery chamber 88. The batteries 92 are arranged in parallel to each other in the battery chamber 88, and directed in opposite directions in the battery chamber to contact the electrode plates 94 and 96. The electrode plate 94 is electrically connected to the casing 10, and the electrode plate 96 is electrically connected to the power supply circuit board 84 through a power source cable (not shown) so that electric power is supplied from the batteries 92 to the power supply circuit board 84. The power supply circuit board 84 supplies electric power to the CCD 72 mounted on the circuit board 70, the electric parts such as the microcomputer and the memory mounted on the control circuit board 85, and the LCD monitor 86.

As shown in FIG. 1 through FIG. 4, it is possible to provide a video output terminal 102, for example, as an external connector, on the power supply circuit board 84, and in this case, a hole 104 is formed in the front wall of the main casing section 10A so that an external connector is connected to the video output terminal 102. Further, as shown in FIGS. 2 and 3, a CF-card driver 106, in which a CF-card can be detachably mounted as a memory card, may be provided below the control circuit board 85 on the bottom of the main casing section 10A.

As shown in FIGS. 2, 4, and 8, the bottom of the main casing section 10A is provided with a screw-hole forming part 108. The screw-hole forming part 108 is a thick portion having a circular section, and a screw-hole 110 is formed in the thick portion, as shown in FIG. 8. The screw-hole 110 of the screw-hole forming part 108 is connected to a screw attached to a tripod head.

Further, although the helicoid cam grooves 75 are formed on an inner surface of the rotary wheel cylinder 57 and the projection engaged with the helicoid cam grooves 75 is provided on an outer surface of the lens barrel 58, the helicoid cam grooves 75 may be formed on the outer surface of the lens barrel 58 and the projection may be provided on the inner surface of the rotary wheel cylinder 57.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2002-241863 (filed on Aug. 22, 2002) which is expressly incorporated herein, by reference, in its entirety.

The invention claimed is:

1. A binocular telescope with a photographing function, said binocular telescope having a pair of observation optical systems with an adjustable interpupillary distance, and a photographing optical system, said pair of observation optical systems being utilized as a focusing device for said photographing optical system, said binocular telescope comprising:

a first focusing mechanism that focuses said pair of observation optical systems so as to observe an object through said pair of observation optical systems;

a second focusing mechanism that focuses said photographing optical system so as to photograph said object through said photographing optical system;

an association mechanism that associates said first and second focusing mechanisms with each other such that said pair of observation optical systems and said photographing optical system are always kept in a focused state;

a pair of reticle elements on which reticles are formed, and which are provided in each observation optical system of said pair of observation optical systems for focusing said pair of observation optical systems with a predetermined dioptric power during an operation of said first and second focusing mechanisms, each of said pair of reticle elements being arranged at an in-focus position of an objective lens system of said observation optical system, a position of an ocular lens system of said observation optical system being adjustable relative to the position of said reticle element so as to adjust the dioptric power; and an interpupillary distance adjuster that adjusts the distance between the optical axes of said pair of observation optical systems;

wherein, when the optical axes of said pair of observation optical systems are made completely coincident with the interpupillary distance of the user by using said interpupillary distance adjuster so that reticle images of said pair of reticle elements are fused, the fused reticle images are geometrically non-coordinate with each other and form a cross.

2. A binocular telescope according to claim 1, wherein each of said reticles comprises at least one line segment.

3. A binocular telescope according to claim 2, wherein each of said reticles comprises at least two line segments, which extend radially from the optical axis of the corresponding observation optical system.

4. A binocular telescope according to claim 2, wherein each of said reticles comprises at least two line segments, which extend radially from a circular area encircling the optical axis of the corresponding observation optical system.

5. A binocular telescope according to claim 1, wherein each of said reticles comprises at least one geometrical figure.

6. A binocular telescope according to claim 5, wherein each of said reticles comprises a geometrical figure, the center of which is coincident with the optical axis of the corresponding observation optical system, said geometrical figures being similar figures.

7. A binocular telescope according to claim 1, wherein each of said reticles comprises at least one dot.

8. A binocular telescope according to claim 7, wherein each of said reticles comprises a plurality of dots which are arranged on a plane perpendicular to the optical axis of the corresponding observation optical system, said plurality of dots being aligned on line segments which are symmetrical with respect to a straight line on said plane.

9. A binocular telescope according to claim 7, wherein one of said reticles comprises a dot which is aligned on the optical axis of the corresponding observation optical system, and the other of said reticles comprises a plurality of dots which are arranged on a plane perpendicular to the optical axis of the corresponding observation optical system, and arranged around the optical axis.

10. A binocular telescope according to claim 1, wherein said association mechanism comprises a rotary wheel member having a manually operated rotary wheel; each of said pair of observation optical systems comprises two optical system elements that are movable along the optical axis of said observation optical system to focus said observation optical system; said first focusing mechanism comprises a first movement-conversion mechanism for converting a rotational movement of said rotary wheel member into a relative back-and-forth movement of said two optical system elements; said photographing optical system is movable relative to an imaging plane along the optical axis of said photographing optical system to focus said photographing optical system; and said second focusing mechanism comprises a second movement-conversion mechanism for converting a rotational movement of said rotary wheel member into a back-and-forth movement of said photographing optical system elements relative to said imaging plane.

11. A binocular telescope according to claim 10, wherein said rotary wheel member comprises a rotary wheel cylinder in which a lens barrel is housed so as to be movable along the central axis of said rotary wheel cylinder; said photographing optical system is housed in said lens barrel; said second movement-conversion mechanism comprises a first cam groove formed in one of said rotary wheel cylinder and said lens barrel, and a first cam follower formed in the other of said rotary wheel cylinder and said lens barrel; and said first cam groove is configured such that a rotational movement of said rotary wheel cylinder is converted into a back-and-forth movement of said lens barrel along the central axis of said rotary wheel cylinder.

12. A binocular telescope according to claim 11, wherein said first movement-conversion mechanism comprises a second cam groove formed on an outer surface of said rotary wheel cylinder, an annular member that has a second cam follower engaged with said first cam groove and that is attached on an outer surface of said rotary wheel cylinder to move along the central axis of said rotary wheel cylinder, and a movement transmission mechanism that transmits the movement of said annular member to one of said two optical system elements of each of said pair of observation optical systems.

13. A binocular telescope according to claim 10, wherein said pair of observation optical systems are mounted on an optical system mount plate that comprises first and second plates that are movable relative to each other, one of said pair of observation optical systems is on said first plate, and the other of said pair of observation optical systems is on said second plate, so that the distance between the optical axes of said pair of observation optical systems is adjusted by changing the relative positions of said first and second plates.

14. A binocular telescope according to claim 13, wherein said first and second plates are linearly moved relative to each other, so that the optical axes of said pair of observation optical systems are moved in a predetermined plane, whereby the distance between the optical axes of said pair of observation optical systems is changed.

15. A binocular telescope according to claim 1, wherein a shape of a reticle image of a first reticle element of said pair of reticle elements is different than a shape of a reticle image of a second reticle element of said pair of reticle elements.

* * * * *